INVENTOR.
EDWIN R. WOODING

BY Geoffrey Knight
ATTORNEY

| DIGIT IMPULSE | IMPULSE O | IMPULSE X | IMPULSE R | N PULSE |
|---|---|---|---|---|
| 1 | / | J | A | 1 |
| 2 | S | K | B | 2 |
| 3 | T | L | C | 3 |
| 4 | U | M | D | 4 |
| 5 | V | N | E | 5 |
| 6 | W | O | F | 6 |
| 7 | X | P | G | 7 |
| 8 | Y | Q | H | 8 |
| 9 | Z | R | I | 9 |
| 0 | | | | 0 |

*INVENTOR.*
EDWIN R. WOODING
BY *Geoffrey Knight*
ATTORNEY

Sept. 9, 1958 E. R. WOODING 2,850,967

VARIABLE MULTI-LINE PRINTER

Filed Jan. 20, 1954 9 Sheets-Sheet 3

INVENTOR.
EDWIN R. WOODING

BY Geoffrey Knight
ATTORNEY

Sept. 9, 1958 E. R. WOODING 2,850,967

VARIABLE MULTI-LINE PRINTER

Filed Jan. 20, 1954 9 Sheets-Sheet 4

INVENTOR.
EDWIN R. WOODING

BY Geoffrey Knight
ATTORNEY

VARIABLE MULTI-LINE PRINTER

Filed Jan. 20, 1954 9 Sheets-Sheet 5

INVENTOR.
EDWIN R. WOODING

BY Geoffrey Knight
ATTORNEY

INVENTOR.
EDWIN R. WOODING
BY Geoffrey Knight
ATTORNEY

INVENTOR.
EDWIN R. WOODING
BY Geoffrey Knight
ATTORNEY

Sept. 9, 1958 E. R. WOODING 2,850,967

VARIABLE MULTI-LINE PRINTER

Filed Jan. 20, 1954 9 Sheets-Sheet 8

INVENTOR.
EDWIN R. WOODING

BY Geoffrey Knight

ATTORNEY

Sept. 9, 1958 E. R. WOODING 2,850,967

VARIABLE MULTI-LINE PRINTER

Filed Jan. 20, 1954 9 Sheets-Sheet 9

INVENTOR.
EDWIN R. WOODING

BY Geoffrey Knight

ATTORNEY

United States Patent Office 2,850,967

Patented Sept. 9, 1958

2,850,967

VARIABLE MULTI-LINE PRINTER

Edwin R. Wooding, Johnson City, N. Y., assignor to International Business Machines Corporation, New York, N. Y., a corporation of New York Application January 20, 1954, Serial No. 405,093

7 Claims. (Cl. 101—93)

This invention relates generally to printing and record feeding devices and more particularly to means for printing addresses on a web of record material under control of a printing tabulator through which are passed tabulating record cards bearing name and address data.

In large business establishments employing mechanized card controlled accounting systems it is customary to have the name and address cards separate from the so-called transaction or detail cards which bear information concerning a particular item of sale or service rendered. Periodically bills are prepared for the consumer and the procedure in general entails the sorting and merging of the detail cards with related name and address cards and thereafter passing them through card controlled printing tabulators of the type wherein a single line of printing impressions is obtained for each machine cycle of operation.

The bill is prepared by listing the name and address parts in the so-called heading section and listing the detail data in the body section. Along with the detail listing of data, the machine is undergoing the various calculations associated with each transaction so as to obtain the necessary total charges. Because of the fact that the printing line in these particular billing procedures is relatively wide and that it includes the calculations the single line of printing for each machine cycle is justable. However, such speeds would be too slow for producing address strips used for mailing purposes. Therefore, while it is desirable to use the system of name and address cards already in existence for an additional purpose it is even more desirable to provide some way of speeding the preparation of addresses per se particularly when the address has no particular relation to the processing of numeric accounting data. For that purpose there is provided the invention described in a copending application to J. J. Nolan, Serial No. 324,563, filed December 6, 1952, now U. S. Patent No. 2,770,188.

In said Nolan application means are provided whereby three or four address lines may be printed simultaneously from a succession of record cards through the full utilization of the entire range of print capacity of a machine such as a tabulator which ordinarily includes from 100 to 120 separately adjustable printing members arranged in a single line across the width of the printer unit of the machine. The full employment of the printing members is made possible as described in said Nolan application by subdividing the 120 positions of printing across the tabulator into equally spaced groups and using them simultaneously for separate address parts of different addresses, such as printing the name of one, the street identification of a second and the city and State identification of a third. In order to accomplish this the narrow address strip or tape is arranged diagonally across the printing line with the strip length running along the length of the printing line and within the range of the full width of the printer unit and arranged so that the several different portions of impressions fall along the length of the strip and on different line space portions. The angle of inclination of the strip from the horizontal is such that when the strip is advanced a space equivalent to the spacing of the separated groups of the aligned type members, the printed address line of one portion is not only advanced but also elevated one line space with respect to the printing line. Therefore, while the strip is only advanced the length of one address portion for each cycle, it has printed thereon three, four or more address lines simultaneously on several adjoining tags and thus the printing of a multiple line address portion or tag is completed on each tabulator printing cycle with a gain of time which is threefold or more. It must, however, be realized that the addresses produced in this manner in accordance with the above-mentioned Nolan application are a product of single card addresses, that is to say, that the plurality of address parts related to a single address are recorded in a single card.

The present invention is therefore an improvement over the invention described in the aforementioned Nolan application in that the present invention is provided with means for enabling the printing of a succession of addresses on a record strip from source records in which at least one name card and at least one address card comprise an entire address, the former card constituting the first line of the address, the latter constituting the remaining portions of the address.

Another object resides in the provision of means for enabling the printing of a succession of addresses at a relatively high rate of speed on a record strip from source records wherein the complete address may appear on a single record or may be distributed on at least two records.

Still another object resides in the provision of means for enabling the printing of a succession of addresses at a relatively high rate of speed on a record strip from source records wherein the character of the addresses may vary anywhere from a single line address to a multiple line address which may or may not be distributed in a plurality of records.

Yet another object resides in the provision of recording control means whereby the recording means may be selectively controlled.

Other objects of the invention will be pointed out in the following description and claims and illustrated in the accompanying drawings, which disclose, by way of examples, the principle of the invention and the best mode, which has been contemplated, of applying that principle.

Figs. 6*a* to 6*e* is the circuit diagram.

Figure 7:
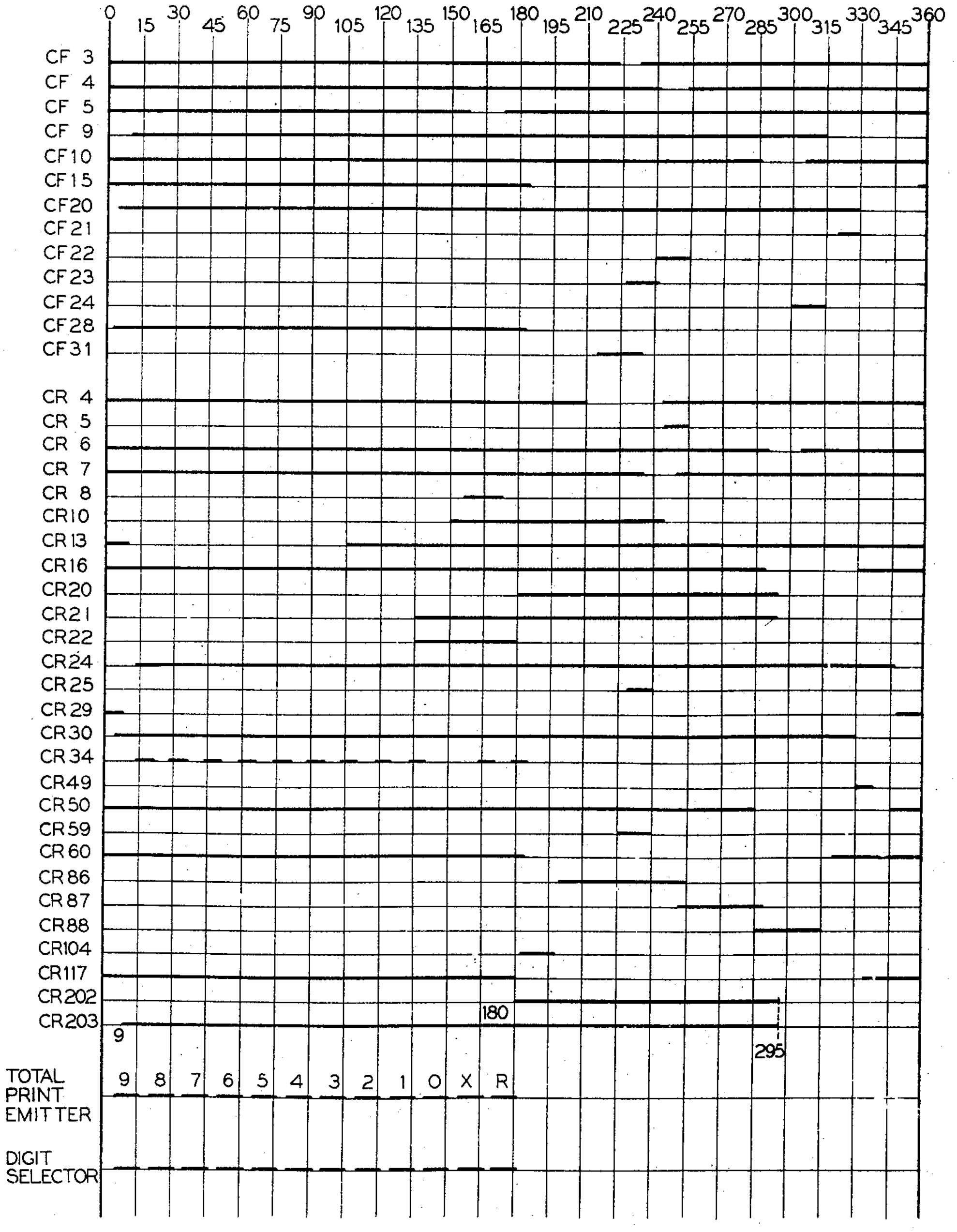
Figure 8:
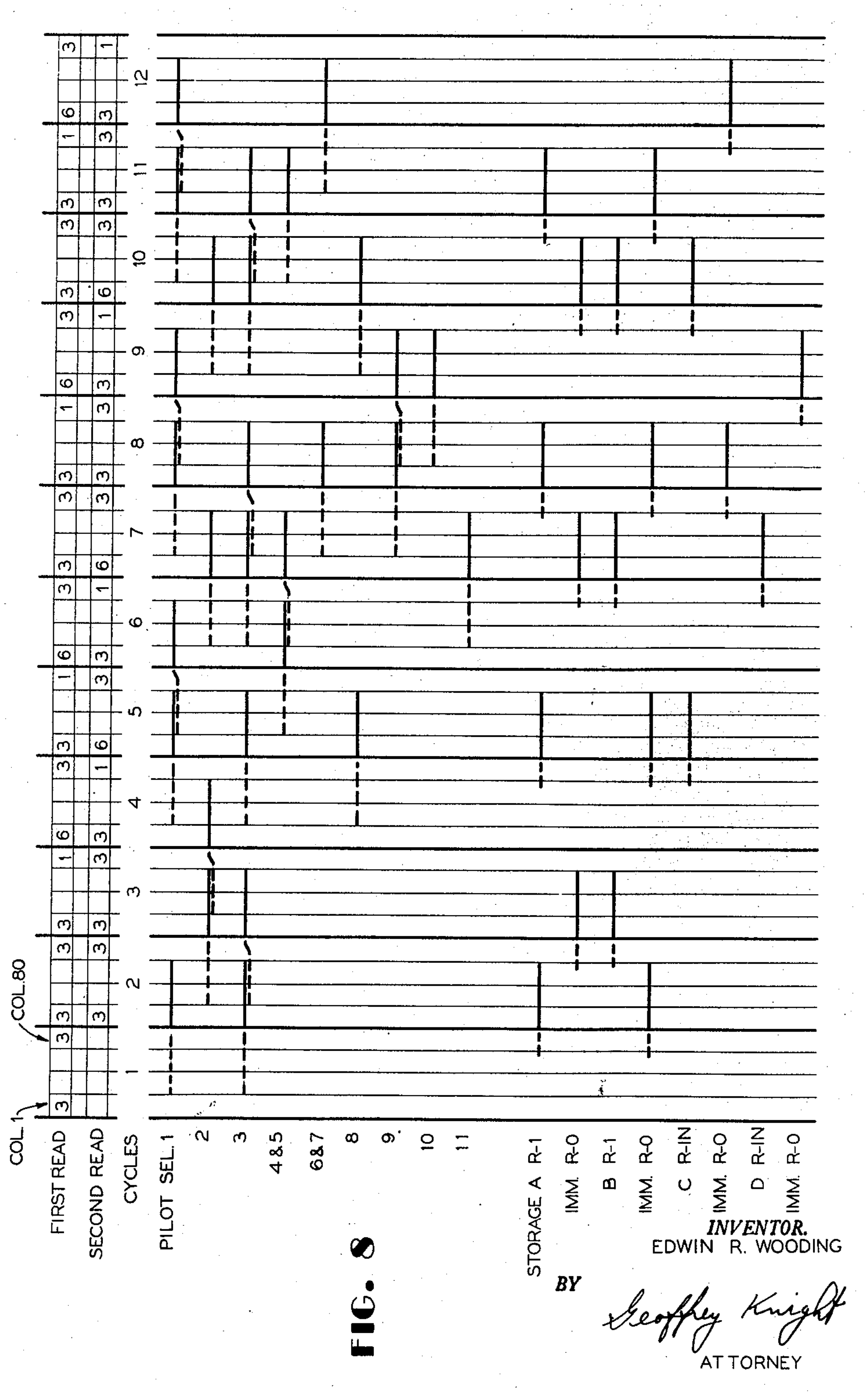

Figs. 7 and 8, respectively, are timing and operational charts.

Figures 3, 4, 5, 9:
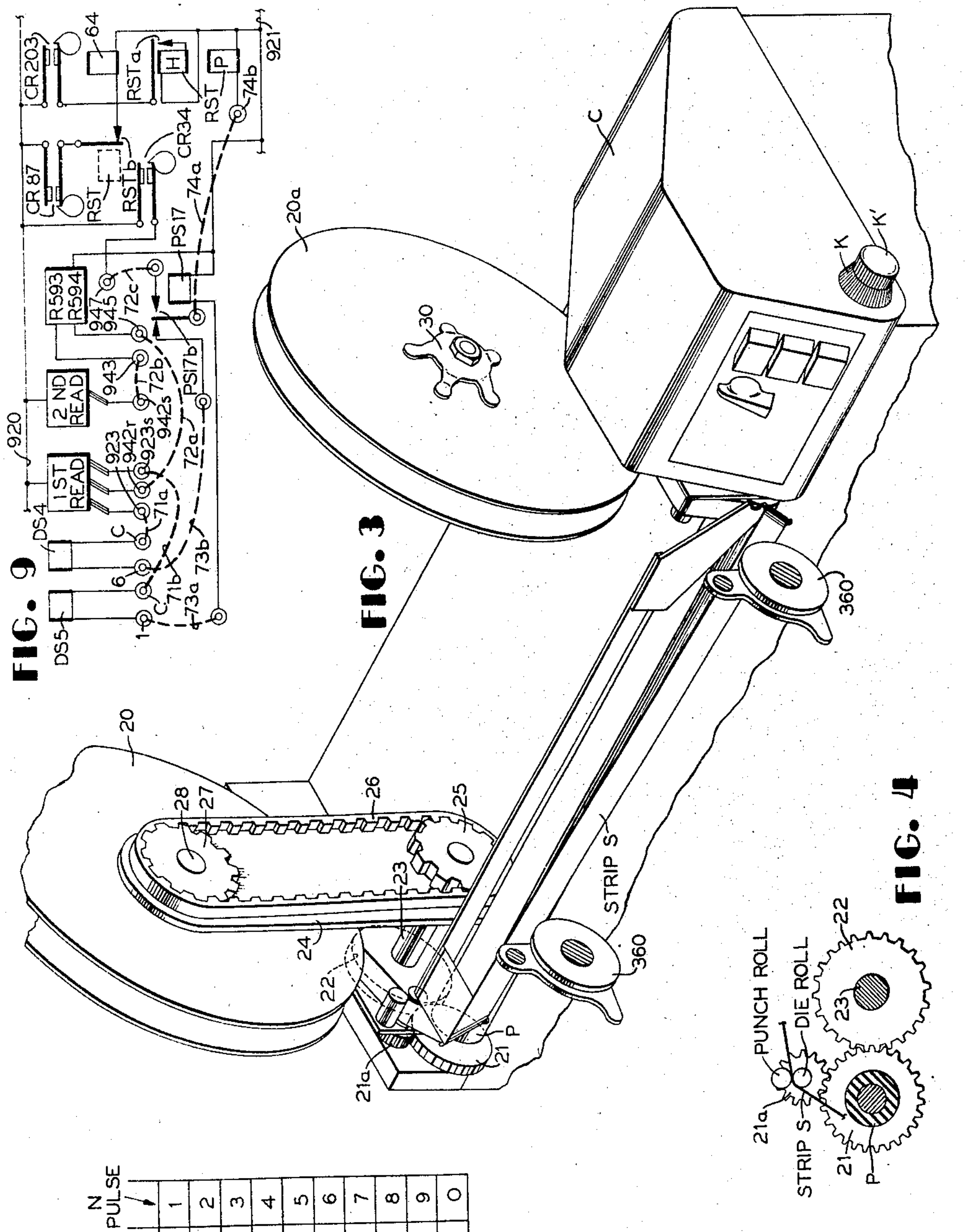
Fig. 3 shows the strip feeding device.
Fig. 4 is a detail showing the punch roll and the die roll.
Fig. 5 is a code chart wherein alphabetic and numeric characters are represented by a combination of zone and numeric designations.

Fig. 9 is a diagrammatic form of card detecting control circuit.

For the purposes of illustration the invention is shown in connection with an alphabet printing tabulator of the kind disclosed in the patent to Rabenda, No. 2,569,829, filed May 3, 1949, and issued October 2, 1951. This patent illustrates the main components of a tabulator known as the IBM "407" alphabet printer with storage.

Heretofore, it was used primarily for printing addresses and accounting data on wide record material advanced vertically with respect to the printing unit. Also of note is the copending Beattie et al. application, Serial No. 74,424, filed on February 3, 1949, for a record controlled printing machine, now U. S. Patent No. 2,687,086.

Figure 1:
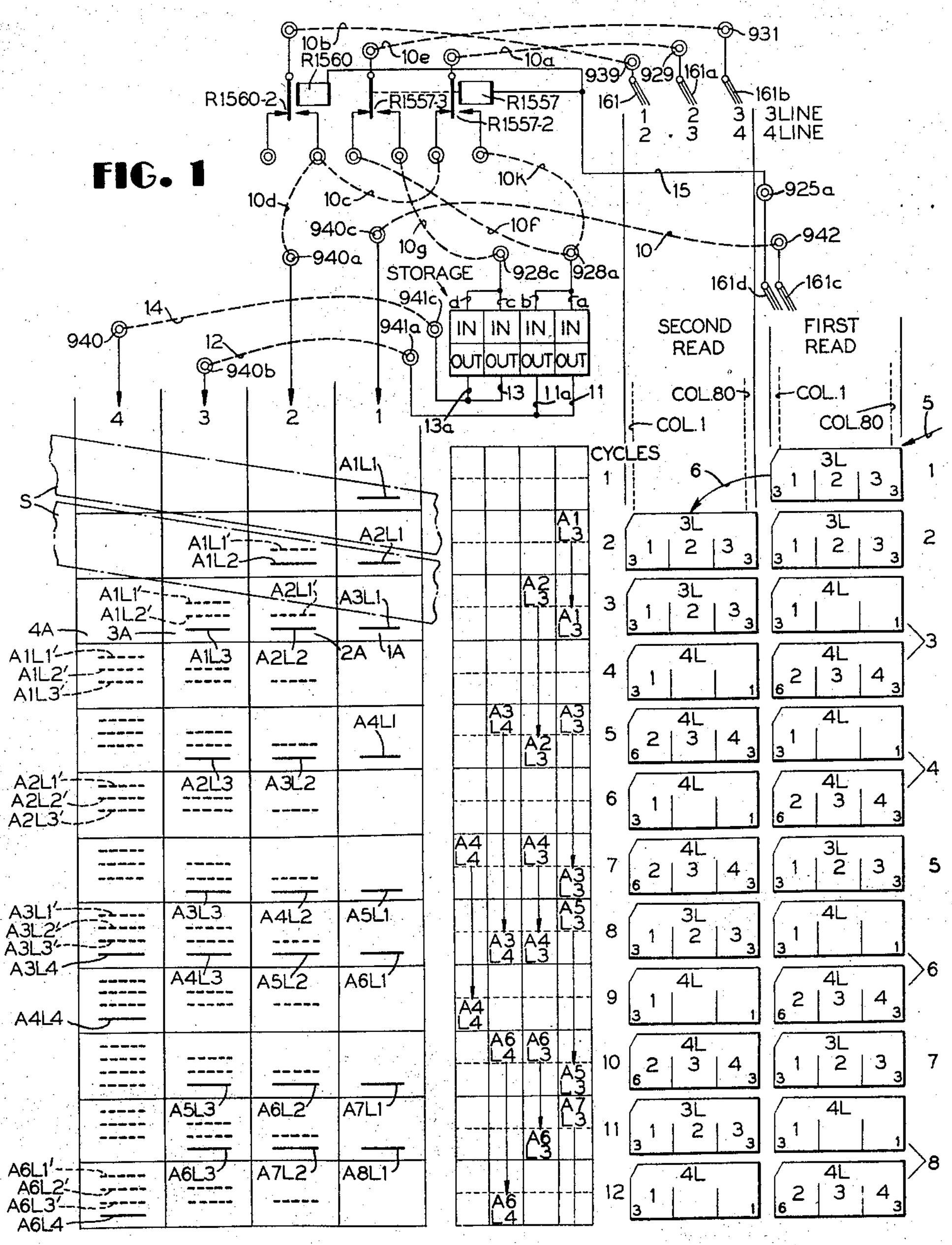
Fig. 1 is a diagrammatic view of the general organization of the means for printing a succession of addresses on a strip from a plurality of address cards.

Figure 1 of the Nolan application, Serial No. 324,563, filed December 6, 1952, shows a narrow strip of address receiving material advanced diagonally across the platen and behind an inking ribbon arranged in the usual fashion parallel and coincident with the printing line across the printer of the tabulator in front of a plurality of separately adjusted type wheels of the printer. The type wheels are provided with printing controls which are adjusted to cause the various address parts, or the like, to be printed with equal spaces therebetween, the width of each space being equal to the width of a printed address portion. Perforated records each containing a complete address are fed successively out of a magazine and through a presensing station and successively through a first reading station, a second reading station and then to a stacker. This is all described in detail in the Rabenda patent and it is sufficient to state that when the record card appears at the first reading station the electrical sensing devices therein cooperate with the card portion devoted to name data perforated therein and such sensing portions are connected to the first group of address printing members for printing the name. When the same card advances into the second reading station there two portions of the card are read; the first portion is read into the second group of printing members to indicate the middle part, that is the street part of the address, while the third card portion relating to city and State is directed into one of two storage devices. The last-mentioned data is read out of storage on the following cycle to print the city and State from the third group of printing wheels.

Thus, there results from the successive impressions of three different address portions and diagonal elevation of the strip, a complete three line address printed for each tabulator printing cycle after the first two. It is to be noted, however, that in this operation each address is a product of a single card address. Now we shall see how the instant invention increases the flexibility of operation to accommodate address cards wherein the address portions are distributed in at least two cards and wherein each address may be either a three line or a four line address.

GENERAL MODE OF OPERATION

Referring to Fig. 1 of the instant application there is shown in diagrammatic form the general organization of the means for printing a succession of addresses on a strip S which is moved diagonally from right to left across the printing line of a tabulator of the type such as the 407 type mentioned hereinabove. The printing instrumentalities of this 407 machine are divided into four groups represented by the four vertical columns 4, 3, 2 and 1 on the left-hand side of the drawing. These vertical columns 4 to 1 are further divided by 13 horizontal lines to represent 12 printing cycles of the tabulator. Thus, each printing cycle is represented by a horizontal row of four rectangles such as 4A, 3A, 2A and 1A and within each rectangular box there are to be noted short horizontal lines one of which is a solid line whereas the others are broken lines. The solid line indicates a line of address which has just been printed on the strip S in a particular cycle in progress, whereas the broken lines indicate the lines of addresses which have been printed on cycles prior to the cycle in which printing has just been completed. The strip S is shown only for the first two cycles so as to avoid showing unnecessary lines. The four printing groups, namely 4—3—2—1, will accommodate addresses from one to four lines inclusive. The first line of an address is always printed by group 1, line 2 by group 2 and so on.

Figure 2:
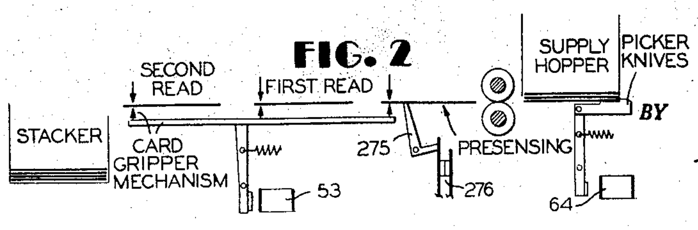
Fig. 2 shows in diagrammatic form the feed of the tabulator.

On the right-hand side of Fig. 1 there are seen two vertical rows of record cards, representative of a single deck which is passed through the feed of the 407 printing tabulator described in the aforementioned Rabenda patent and diagrammatically shown in Fig. 2 of the instant application. The top of the extreme right-hand column represents the first read station of the 407 feed unit whereas the top of the next column to the left represents the second read station of the 407 feed unit. The cards are then passed singly and successively from the feed magazine to a presensing station and then through the first read and then the second read and finally deposited in the stacker of the feed. For the particular purpose at hand we need only show the first and second read portions of the feed and the sequence of passing the cards through the first and second read stations begins with the card which is indicated by the arrow 5; this is the first card entering the first read. Following this the card proceeds to the second read indicated by the curved arrow 6. Thus, in the first cycle shown the first address card is positioned in the first read and on the following cycle, cycle 2, the first card occupies the second read while the second card of the deck now occupies the first read. In the illustrative example the cards progress in this manner for 12 machine cycles, the cycles being appropriately indicated by a column of Figures 1 to 12 immediately to the left of the second read.

It is to be noted that each card is divided into three fields numbered 1, 2 and 3. Each field contains data representing a line of address. The deck consists of three line address cards and four line address cards. The three line address cards contain a complete address on a single card and each such card is identified by a notation "3L" written across the top edge of the card, whereas the four line address cards are in two-card groups, with each card carrying only part of a complete address. Each four line address card is identified by a notation "4L" written across the top edge of the card. The first card of a four line address contains the name, which is recorded in field 1. The second card of a four line address contains three lines of address data respectively recorded in fields 2, 3 and 4. It is to be noted that in the deck of 12 cards, four cards represent four 3 line addresses while the remaining eight cards constitute four 4 line addresses. The column of Figures 1 through 8 on the extreme right-hand side of the drawing indicates the eight addresses.

In order to associate the various printed lines of addresses on the strip 3 with related address cards the following system of notations is used: A1L1 denotes address 1, line 1 and is obtained from the first card of the deck shown in the extreme right-hand column. By the same token A3L4 denotes address 3, line 4 obtained from the fourth card of the deck, which incidentally is the second card of a four line address. In a particular cycle of printing the heavy horizontal line indicates printing of a particular line of address; for example, A1L1 is printed in cycle 1 from printing group 1. A notation further characterized by a prime, for example, A1L1′ indicates that the information was printed on a cycle prior to the one in question; the primed notations are directed to the horizontal broken lines on the strip S.

Although details of the cards are not shown, they are of a type shown in the patent to C. D. Lake, No. 1,772,492, granted August 12, 1930. In general, the card has perforations, not shown, which are arranged in vertical columns and in horizontal rows, through which perforations electrical circuits are made to control functions of the machine.

The electrical circuits are established by means of brushes, such as 161, having connections to plug sockets, such as 939 (corresponding to 923 in Fig. 31*g* of the afore-mentioned Rabenda patent). Returning to Fig. 1, of the instant case, the above-mentioned brushes and plug sockets are shown diagrammatically to the extent that brush 161 and its associated plug socket 923 in reality represent a plurality of such elements whereby an entire card field constituting an address line is read. Thus, in the second read, brushes 161, 161$a$ and 161$b$ are each representative of a plurality of like elements arranged above the fields 1, 2 and 3, respectively of a 3 line address or fields 2, 3 and 4, respectively of a 4 line address. Field 1 is read by a brush 161$c$ also representative of a plurality of like elements located in the first read.

In like manner plug sockets 940, 940$a$, 940$b$ and 940$c$ are each representative of a plurality of plug sockets each in turn connected to a printing wheel as shown in the Rabenda patent. In the instant case each plug socket 940 to 940$c$ is associated with the printing groups respectively 4—3—2 and 1 and in which the appropriate address lines are set up and printed on the strip S.

The printing of line 1 of an adress, regardless of whether it comes from a 3 line or a 4 line address, extends through a path beginning with brush 161$c$ at the first read and following through plug socket 942, plug wire 10, plug socket 940$c$ and into printing group 1. Thus, under printing group 1 the following first lines of the eight addresses of the deck are printed: A1L1, A2L1, A3L1, A4L1, A5L1, A6L1, A7L1 and A8L1.

Line 2 of a 3 line address is printed out of group 2 and is read out of the second read brush 161$a$ through plug socket 929, plug wire 10$a$, normally closed points of R1557—2, plug wires 10$c$ and 10$d$, plug socket 940$a$ to printing group 2. Data of this nature is shown printed as A1L2, A2L2, A5L2 and A7L2. On the other hand data representing line 2 and associated with a 4 line address is also printed out of group 2, but in this case, it is read from second read brush 161 through plug socket 939, plug wire 10$b$, normally open points of R1560—2, plug wire 10$d$, plug socket 940$a$ to printing group 2. A3L2, A4L2 and A6L2 are examples.

It may be noted at this point that the selection of the second line from either a 3 line address card or a 4 line address card are under control of a pair of relays identified as R1557 and R1560 respectively, connected to a plug wire 15 to a plug socket 925$a$ leading to a first read brush 161$d$ for sensing a special perforation "6" in column 1 of the second card of a 4 line address. The details of these controls will be more fully described under the circuit description. For the present, it is sufficient to state that the selection device is the well-known pilot selector described in the afore-mentioned Rabenda patent which when controlled as in this instance by the special perforation "6" causes the selection to be operative on the immediately following cycle thereby switching the connections from field 2 of a 3 line address to field 2 of a 4 line address.

Since the printings of line 3 and 4 are effected on cycles following the cycle in which they are read in the second read, it is necessary that the data be stored in storage units and released at the appropriate time in a subsequent cycle. For this purpose storage units A, B, C and D are provided. Units A and B are controlled to store data associated with line 3 while units C and D are controlled to store data associated with line 4.

The storage units are of the type shown and described in the Rabenda patent. Since the storage units as shown therein have a limited capacity each of eight positions for alphabetic storage it is understood that for capacities of say up to 20 positions of alphabetic storage it is only necessary to provide the machine with a sufficient number of storage devices and to wire them in parallel. It is therefore to be understood that the diagrammatic representations of the storage units A, B, C, D shown in Fig. 1 are each representative of the necessary units wired in parallel to accommodate the required alphabetic storage. It is to be further observed that the entries to the four storage units are controlled through two entry plug sockets namely 928 and 928$c$ when in actual practice each unit, having a capacity of eight alphabetic storage positions, is provided with at least eight entry plug sockets. It is therefore to be understood that the entry of data representing line 3 and line 4 is through the entry plug sockets 928$a$ and 928$c$, respectively, and each plug socket is representative of at least 20 entries and each entry corresponds to an associated column in a line of address recorded in an address card. The storage exit is diagrammatically represented by two exit plug sockets namely 941$a$ and 941$c$ and it is understood here that each exit plug socket is also representative of a plurality of plug sockets.

In order to show the activity of each storage unit for each cycle of operation the storage units are shown duplicated for the 12 cycles of operation with a particular line of address shown as being read in on a given cycle and read out on a subsequent cycle. The read-in and the readout operations are shown represented by an arrow drawn in a vertical direction with the top end of the arrow designating the point where particular address data is read into storage while the bottom or arrow end designates the point where the same address data is read out of storage. For example, under storage unit A it is to be observed that in the second cycle data A1L3 (address 1, line 3) is read into storage unit A and held therein until released on the following cycle. By means of this system of representation the reading, storing and print of any address data may be conveniently traced.

As a point of illustration, data representing line 3, for example A1L3, and associated with a 3 line address is read at second read (cycle 2) by means of brush 161$b$ and transmitted through plug socket 931, plug wire 10$e$, R1557—3 normally closed points, plug wire 10$f$, plug socket 928$a$ and into storage unit A. In the case of data representing line 3 (A3L3) but associated with a 4 line address a path of transmission follows from second read brush 161$a$, plug socket 929, plug wire 10$a$, R1557—2 normally open points, plug wire 10$k$, plug hub 928$a$ and into storage unit A.

The data representing A1L3 is read out of storage unit A on the third cycle and transmitted through wire 11, plug socket 941$a$, plug wire 12, plug socket 940$b$ and printed out of printing group 3. If it should happen that a succession of 3 line addresses are passing through the feed of the machine then it may be appreciated that storage units A and B are alternately used to store line 3 data. This is necessary in view of the fact that when the line 3 of one address is being printed out of storage the next succeeding third line of data is being read into storage hence the necessity for two storage units. This of course, is true as in the present case where a feed unit with but two sensing stations is employed.

The matter of controlling the alternation of storage units A and B will be discussed in more detail under circuits; for the present however, it is merely to be noted that the alternation occurs for example in cycle 3 in which case data is being read into storage unit B while storage unit A is reading out data. The alternation of storage units A and B also occurs in cycles 5, 7, 8 and 10 but in these cases line 3 data is derived from 4 line address cards as well as from 3 line address cards. Thus, the period of alternation in these cases is different from that observed in cycle 3. The readout of line 3 data from storage unit B follows along line 11$a$, plug socket 941$a$, plug wire 12, plug socket 940$b$ and into printing group 3. Under printing group 3 it may be seen that third line data is printed in cycles 3, 5, 7, 8, 10 and 11, respectively identified as A1L3, A2L3, A3L3, A4L3, A5L3 and A6L3, the data identified with 3 line addresses being A1L3, A2L3, A5L3 and A7L3 while the remaining ones represent data derived from 4 line addresses.

Line 4 data is of course, read from field 4 of a 4 line address, the data is transmitted into storage and read out on a subsequent cycle into printing bank 4, In cycle 5, for example, a line 4 (A3L4) is encountered and read out of second read by means of brush 161*b*, through plug socket 931, plug wire 10*e*, R1557—3 normally open points, plug wire 10*g*, plug socket 928*c* and into storage unit C, where it will remain until released on the eighth cycle and transmitted by way of wire 13, plug socket 941*c*, plug wire 14, plug socket 940 and into printing group 4. It is to be observed that the release of the data A3L4 occurs three cycles after its entry into storage. This delay is due to the fact that the 4 line address is distributed in two cards and a delay in time is therefore imposed in the printing. It is to be further observed that the delay is shortened by a cycle when a 4 line address is followed by a 3 line address, this is true of A4L4 data which is read into storage unit D on cycle 7 and read out two cycles later. The readout from storage D follows along line 13*a*, plug socket 941*c*, plug wire 14, plug socket 940 and into printing group 4.

Now there are to be considered the operations surrounding the movement of the strip S. The strip S is shifted, by means to be described, after a printing operation is exercised in printing group 1. Taking this as a general rule it may be appreciated in Fig. 1 that the strip S is diagonally shifted 8 times since there are 8 printing operations exercised by printing group 1. Thus, after a printing operation is completed by printing group 1 the strip S is diagonally shifted to the left and held in readiness for the next recording operation. As earlier explained, each diagonal shift of the strip causes the printed address line to not only advance from one printing group to the next succeeding printing group, but also elevates the strip one line space with respect to the printing line. The means for shifting the strip is under control of a special perforation in column 1 of the first card of each address. From an inspection of the address cards in Fig. 1 it may be seen that a "3" perforation in column 1 identifies the first card of an address. Since line 1 of an address is printed from first read, the control for shifting the strip is therefore taken from first read column 1.

The foregoing explains activities surrounding card reading, data storage, printing and strip movement. Now there is to be pointed out in conjunction with these activities a novel feature of the invention.

Referring to Fig. 1, specifically in cycle 3, it is seen that three different address parts namely A1L3, A2L2 and A3L1 are printed, A1L3 being derived from storage A, while A2L2 is derived from a 3 line address card located in the second read, and finally A3L1 is obtained from the first card of a 4 line address located in the first read. After printing the strip is shifted in the manner described. In the fourth cycle it is seen that the first card of the 4 line address is now in the second read while the second card of the same 4 line address now occupies the first read. If printing were permitted in this cycle there not only would result a duplication in the printing of A3L1 but also the incorrect positioning in the printing of A3L2 in printing group 1. To avoid this the invention provides printing control means for printing groups 1 and 2 and in this particular cycle of operation, the printing is suppressed for printing groups 1 and 2. It might also be noted that no printing occurs in printing groups 3 and 4. In this instance printing group 4 does not print since data for line 4 has not been made available as yet while line 3 might have printed since it was available in storage. The delay in printing line 3 until the following cycle does not impose any additional time delay since the strip cannot be moved until after printing has occurred in printing group 1. In the absence of a printing operation in this fourth cycle the strip is not advanced. On the following cycle, cycle 5, the second card of the 4 line address in question (address 3) now occupies the second read while the first card of the next succeeding 4 line address (address 4) occupies the first read. From this set of conditions, printing is exercised for printing groups 1, 2 and 3 for the printing of A2L3, A3L2 and A4L1 following which the strip is advanced. The printing control means is again operative for cycle 6 in view of the fact that conditions described for cycle 4 are now duplicated in this cycle. Thus, in cycle 6 printing is suppressed for printing groups 1 and 2 and printing in printing groups 3 and 4 is non-effective because of the conditions imposed by the wiring controls which will be explained later on under the circuit description. The situation is again repeated in cycles 9 and 12 except that in these cycles printing is exercised for printing group 4. The reason for this is the situation that is presented when a 3 line address follows a 4 line address.

Beginning with cycle 3, the first address completed is a 3 line address comprising A1L1', A1L2' and A1L3, the former printed on prior cycles while the latter is printed in this cycle. Another 3 line address is completed in cycle 5 with the printing of A2L3. The first 4 line address is completed in cycle 8 with the printing of A3L4. Here it is to be further observed that the address portions A3L3', A3L2' and A3L1' were printed on prior cycles respectively in cycles 7, 5 and 3. Another 4 line address is completed in the following cycle, cycle 9. In cycle 10 another 3 line address is completed with the printing of A5L3. In cycle 12 still another 4 line address is completed with the printing of A6L4.

The foregoing explains in a general manner the printing of a succession of addresses on a record strip from source records consisting of 3 line and 4 line addresses, the latter being distributed on at least two cards. Now there will be explained in greater detail the instrumentalities and the controls associated therewith for producing the address strip.

ALPHABET PRINTING MECHANISM

The printing mechanism is of the kind shown and described in complete detail in the patent to R. E. Page and H. S. Beattie, No. 2,438,071, dated March 16, 1948. As described therein the printing mechanism employs type wheels 360 each bearing the complete alphabet A through Z, numeric characters 0 through 9 and other characters of a special nature. The wheel 360 is shown diagrammatically in Fig. 3 of the instant application.

The alphabet types are selected by impulses according to the code shown in Fig. 5. The particular O, X, or R impulse determines which of several types of a group selected by an impulse 1–9 will be printed. For example, if the impulse "2" and no pilot impulse is utilized, i. e., neither the O, X or R impulse, the digit 2 will be printed. If an impulse is also at O such impulse will select the S type; if the X impulse, type K will be selected and if the R impulse, type B will be selected.

Each impulse 1–9 selects a group of three non-numeral type and also a numeral type. If a numeral is to be selected for printing, the printing will be under control of the "N" pulse, which pulse is after the R zone impulse (see Fig. 7, timing for "N" impulse). The alphabet type selection is provided for by taking printing impressions before the time a numeral type would have been printed and this is effected under control of the O, X and R impulses.

If the impulse is 9 alone, the printing wheel 360 (Fig. 3) will be rotated counterclockwise until the 9 type is at the printing line and then the printing wheel 360 will be rocked by the "N" pulse to effect the priming impression. It will be noted that if an additional impulse such as a 12 is delivered then, under control of this impulse the printing wheel will be rocked earlier than for printing the 9 digit to take an imprint from the I type. The X zone impulse will rock the printing wheel 360 to take an imprint still earlier to print R and the impulse O even still earlier to print Z.

The details of the printing mechanism are all very well explained in the afore-mentioned Page and Beattie patent as well as the patent to Rabenda, No. 2,569,829. In the latter in particular, the description begins on page 21 of the specification under the heading "Alphabet Printing Mechanism." For the present it is sufficient to say that each printing wheel is under control of a printing magnet 361, shown in Fig. 6*c* of the circuit diagram of the instant case, the energization of which will be described later on under the circuit description.

STORAGE MEANS

For convenience, the storage means are of the type shown in Fig. 18 of the Rabenda patent, No. 2,569,829. Each storage unit shown therein has a capacity of 16 positions of numeric storage. When arranged for alphabetic storage however, the unit is capable of storing eight positions of alphabetic information. Each unit is adapted to be controlled by a restoring magnet identified as SRA in Fig. 20 of said patent. When this magnet is energized the unit is cleared and prepared for the receiving of information wired to the entry plug sockets of the unit. Each entry plug socket is connected to a magnet such as SA shown in Figs. 19 and 31*i* of said patent, which magnet when energized by a particular index point perforation 1–12 in the record card, positions a movable setup ratchet member. In the case of alphabetic data where two perforations denote a character, two of said magnets will be energized to store each character. This will be described under circuits.

Now each of said so-called setup ratchet members of the storage device is provided with a readout structure comprising mainly a readout commutator having twelve spots or positions and a cooperating wiper which is positioned on a given readout spot in accordance with the positioning of the setup ratchet. This is clearly shown in Figs. 19 and 31*i* of said Rabenda patent and diagrammatically represented as storage A, B, C and D in Fig. 1 of the instant case.

STRIP FEEDING MEANS

Although any type of strip feeding device might be employed to move a strip longitudinally of the printing line, it is convenient to employ the strip feeding device commonly associated with the type 407 printing tabulator. Such a strip feeding device is shown in Figs. 21–30 and fully described in detail in the Rabenda patent, No. 2,569,829. As explained therein this device is adapted to perform a variety of selective line spacing and sheet feeding operations under control of a perforated tape.

To accommodate the diagnoally disposed strip of the instant application, the strip feeding device of said Rabenda patent has been augmented by the provision of means for supporting a supply roll of strip material, a take-up reel on which the printed strip is coiled and drive means for advancing the strip. Since this device forms the subject matter of a sepaarte application, it therefore is shown in somewhat of a general way in Fig. 3.

Referring to Fig. 3 the sheet feeding device is shown as it appears attached near the right end of the platen P before which is shown the diagonally disposed strip S and in front the type wheels 360 of the 407 printing tabular, which type wheels are rotated into the printing positions. At the right end of the platen P, the shaft extends into the mechanism casing C and ends with a pair of knobs K and K'. The mechanism case C encloses the low and high speed platen drive means, the perforated tape and control means for the platen drive means.

The means for operating the take-up reel 20 on which the printed strip becomes coiled as the same unwinds from the supply reel 20*a* and moves longitudinally of the printing line, is shown schematically as constituting a gear 21 secured to the left end of the platen and engaged to another gear 22 in turn attached to a shaft 23 suitably journalled in a frame 24. The opposite end of shaft 23 has secured thereon a sprocket gear 25 which by means of a cooperating sprocket chain 26 imparts motion to another sprocket 27 secured to a shaft 28 also journalled in said frame 24. Said shaft carries and rotates the take-up reel 20 through the medium of a friction device not shown.

The means for feeding said strip includes a pair of rolls, namely a punch roll and a die roll more clearly shown in Fig. 4. The punch roll includes a punch for partially piercing the tape while the latter has a cooperating die which is further attached to and driven by the gear 21*a*. The structure just described is somewhat schematically shown. The actual means for feeding and supporting said strip S is shown and described in detail in the afore-mentioned Nolan application. Member 30 represents friction means for imparting the necessary friction to the supply reel 20*a* so as to keep the strip S taut at all times.

As further described in said Rabenda patent the perforated tape which controls the drive of the platen is perforated in accordance with the distance that the record strip is to be moved. It may further be briefly mentioned that the initiation of a spacing operation is under the control of a signal issuing from the tabulator, such as a signal from a particular perforation in a card passing through the tabulator, while the termination of the spacing operation is under the control of the perforations in the tape of the strip feeding device. It may therefore be appreciated that by virtue of the controls described, the strip S may be controlled in a variety of ways to obtain any desired degree of movement.

In the present case, for example, the control for initiating strip feeding is derived from the address cards, particularly those which control printing in printing group 1 of Fig. 1. By means of a "3" perforation in each of these particular cards it will be explained later on under circuit description how the strip S is spaced after printing has been exercised in printing group 1.

Under the spacing operations of the strip feeding device there is also to be considered the suppression of the so-called line spacing operation which ordinarily occurs in printing tabulators as an incident to a printing cycle. In the case of the instant application it was earlier explained in the preparation of the address strip that on certain 4 line addresses the printing operations were not exercised. It is therefore necessary especially under these conditions to prevent the normal line spacing operations from being effective in order to avoid blank spaces appearing between the parts of each address. The normal line spacing operations are suppressed for all printing operations by rendering the space suppression control circuit effective for all machine cycles.

Also to be considered in connection with the operations of the strip feeding device is the control which must be exercised to insure maximum operating speeds in the preparation of the address strip. The control concerns the release of the interlock in the feed control circuits of the tabulator. The interlock occurs as an incident to a strip feeding operation and is ordinarily effective to disable card feeding operations of the tabulator in order to forestall printing in flight, especially in cases where the time consumed for moving the strip is greater than the time consumed for one machine cycle. In order to provide for continuous card feeding the interlock release is rendered effective at the same time that a strip spacing operation is initiated. For the present, however, it may be appreciated that the same control which is plugged on the control panel of the 407 tabulator for causing the spacing of the strip S is also plugged to the interlock release.

CIRCUIT DESCRIPTION

Before describing the circuits in detail there is to be mentioned the fact that the machine is provided with a series of cam contacts which are well known in construction and operation and are designated as CR and CF cam contacts. The former open and close for each machine cycle while the latter operate only during card reading operations of the feed accompanied or not by a card feed operation.

Other contacts designated as CB contacts are used as circuit breakers and operate continuously for each machine cycle.

There is also to be mentioned the device known in the art as a digit selector which is comprised principally of a circular commutator adapted with 12 electrical segments isolated from each other and a rotating wiper adapted to cooperate with each of said segments once per machine cycle. The twelve segments correspond to the twelve index point positions of the record card and thereby provide a means for issuing a timed impulse for each of the 12 index positions of the card. Each of the segments as well as the wiper terminate at an associated plug socket located on the control panel of the machine.

The timing of the cam contacts CR, CF, CB and digit selectors are shown in Fig. 7.

Figure 6A:
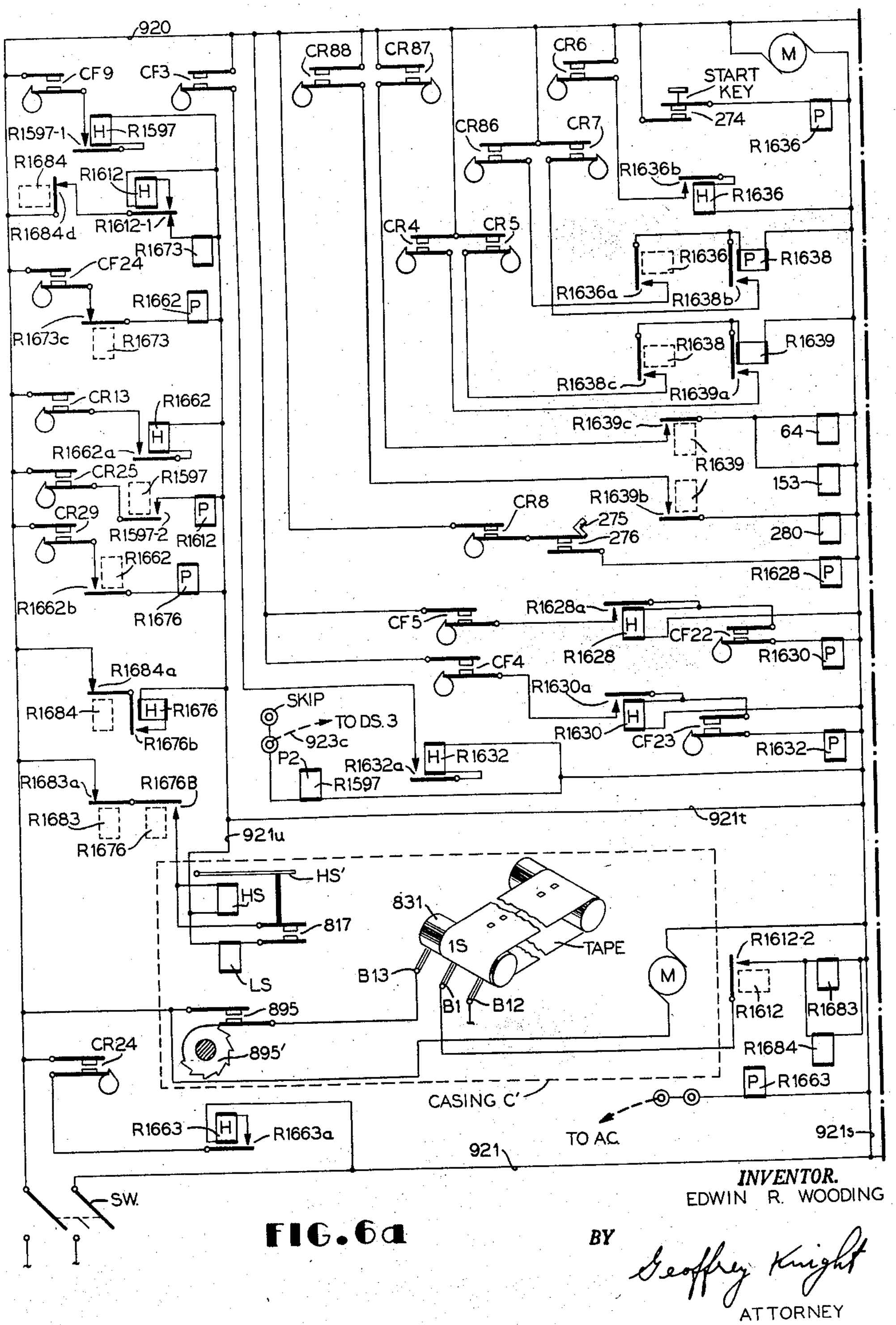

Now referring to the top of Fig. 6*a*, the machine is operated by a drive motor M which is operated when a switch SW is closed. Current is supplied along lines 920 and 921.

*Feed control circuits*

Referring to Fig. 6*a*, card feed operations are initiated by depressing a start key and closing contacts 274 whereupon relay R1636P is energized. A hold circuit for the relay is established through line 921, R1636H, **R1636*b*, CR6 cam contacts to line 920. Upon closure of contacts R1636*a* a pickup circuit is established for the start relay R1638P beginning with line 921 and following through R1638P, R1636*a*, CR86 cam contacts to line 920. Upon closure of contacts R1638*b* a hold circuit is established for relays R1638 through R1638*b* and CR7 cam contacts. The closure of contacts R1638*c* energizes relay R1639 when CR5 cam contacts makes. Upon the closure of contacts R1639*b* and CR88 cam contacts a circuit is established to energize clutch magnet 280 which controls the means for turning the CF cams of the machine. Simultaneously, the closure of R1639*b* and CR87 cam contacts establishes a circuit to energize the picker clutch magnet 64 and the gripper controlling magnet 53, the former initiates operations of the picker knives of the card feed as diagrammatically shown in Fig. 2 while the latter operates the card gripper mechanism. Upon operation of the picker knives the first card of the deck is fed from the supply hopper of the card feed to the presensing station where a card lever 275 is encountered whereupon contacts 276 are closed to complete a circuit, in conjunction with CR8 cam contacts, to energize relay R1628P. The hold circuit for R1628H is established through contacts R1628*a* and CF5 cam contacts. The machine will stop at the end of the first feed cycle unless the start key is held depressed whereupon feeding will continue uninterruptedly after the first cycle as long as the card lever contacts 276** are closed by succeeding cards.

On the next succeeding card cycle and the cycles immediately thereafter relays R1630 and R1632, respectively, will be energized to control the circuits to the sensing means in the first and second reading stations. Relay R1630P is energized through CF22 cam contacts, **R1628*a* and CF5 cam contacts. A hold circuit therefore is established through R1630H, contacts R1630*a* and CF4 cam contacts. Relay R1632P is energized through CF23 cam contacts, R1630*a* and CF4 cam contacts. The hold circuit is established through relay R1632H, R1632*a*, CF3 cam contacts to line 920**.

As further explained in the Rabenda patent the cards are fed successively through the sensing stations by means of the card gripping devices. Since we are not concerned with any selective controls of the card feed unit outside of what was described for run-in operations we may therefore visualize the feed as running continuously and feeding cards from which the various addresses will be printed on the strip S.

*Card analyzing or reading circuits*

Figure 6B:
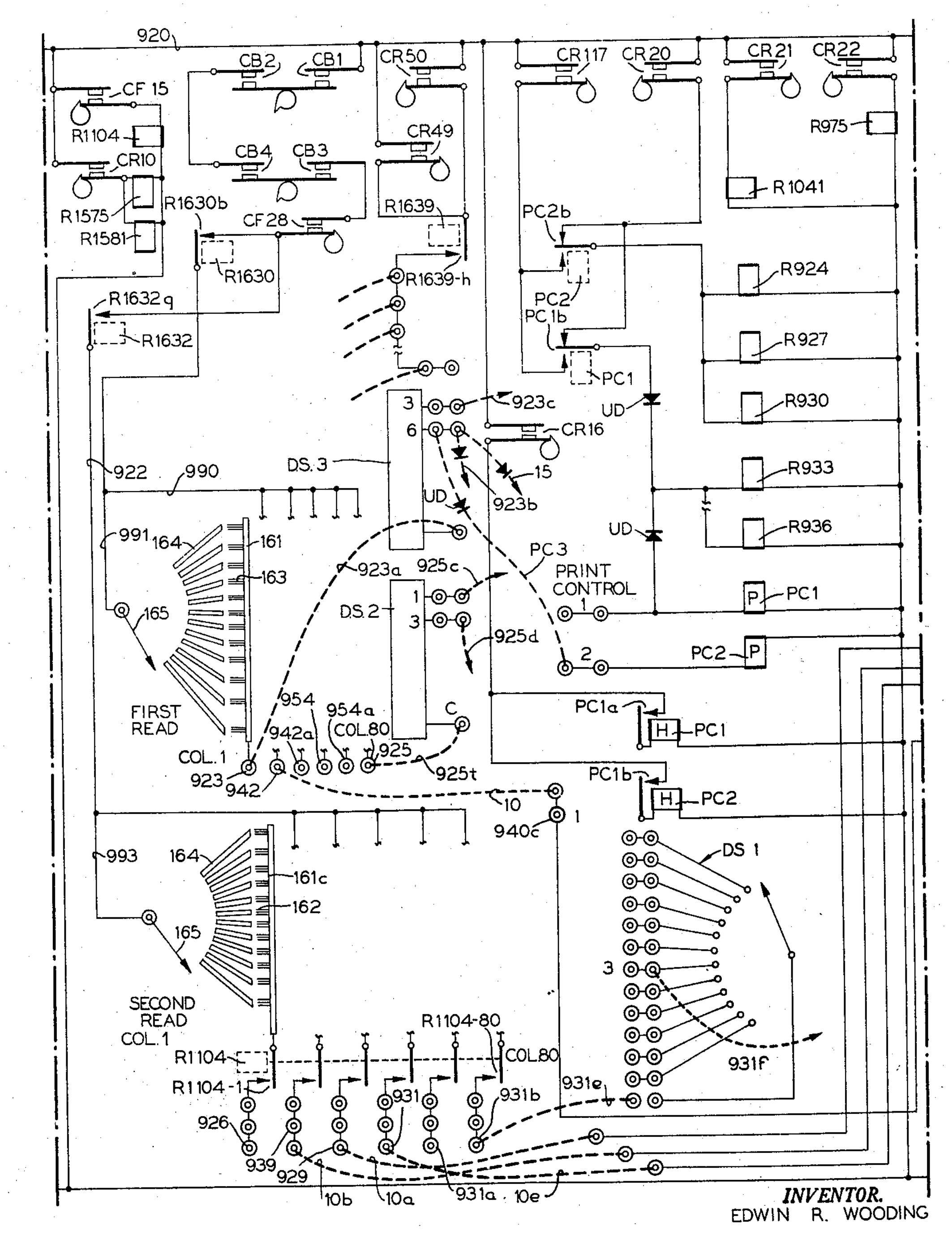

The circuits whereby the perforated cards may be analyzed at the first reading station and the second reading station are shown in Fig. 31*g* of the Rabenda patent and are again repeated somewhat in part in Fig. 6*b* of the instant case where it will be seen that for column 1 the arrangement of the sensing means is shown diagrammatically. Of course, this arrangement is duplicated for the 80 columns in each of the reading stations. The sensing circuit for the first reading station is from the line side 920, circuit breaker contacts CB1–4, CF28 cam contacts, first reading relay **R1630*b* contacts which are closed during the analyzing time, thence to a wire 990. The wire 990 has a respective wire connection 991 to the brush 165 of the first column commutator. It will be recalled that the brush readout 165 makes successive contact with the contact points 164 and the circuit will be closed through the particular brush 162 which passes through the card perforation. Each plate 161 which carries the series of analyzing brushes 162 has a wire connection to a respective plug socket such as socket 923 in the first column. For the first reading station there is a series of eighty plug sockets including 923, 925, 942, 942*a*, 954 and 954*a***, etc., from which plug connections are made for control purposes.

The sensing circuit for the second reading station extends from the CF28 cam contacts, thence through the second reading **R1632*g* relay contacts to a wire 992 which has one first wire 993 of multiple wire connections to the brush readout 165 representative of a series of sensing commutators for the second reading station. There is, likewise, a series of eighty plug sockets including sockets 926, 929, 929*a*, 931, 931*a* and 931*b*** for the second reading station from which plug connections are made to the desired controls or printing orders to effect printing of information corresponding to the perforated data.

The CB1–4 circuit breaker contacts are timed to close and open at such times as it will prevent the arcing at the break and make between the brush readout and the contact points 164 so as to prevent damage at this point of contact. The construction and operation of circuit breaker contacts, such as are employed herein, are well known.

The digit selectors 1, 2 and 3 are also shown in Fig. 6*b*. The digit selector controls the selection of a particular one of a plurality of pulses introduced into the common input plug socket C. Digit selector 1 is connected to column 80 of the second read by means of a plug wire **931*e*. The digit selector 1 is further shown as having a plug wire connection 931*f* in the 3 plug socket thereof. Digit selector 2 is connected by means of plug wire 925*t* to column 80 of the first read and controls the issuance of a 1 pulse and a 3 pulse along plug wires 925*c* and 925*d*. In like manner digit selector 3 is connected by means of a plug wire 923*a* to column 1 of the first read and controls the issuance of a 3 pulse and a 6 pulse. The 3 pulse is directed through plug wire 923*c* while the 6 pulse is directed through plug wires 923*b*, 15 and PC3. Unidirectional devices UD are included in each of these plug wires in order to prevent back circuits. The plug wires 931*f*, 925*c*, 925*d*, 923*b* and 15 are wired to control the operations of so-called pilot selectors which in turn control the selection of the various lines of addresses from the cars as well as the control of the storage devices for read-in and readout operations. Plug wire 923*c* controls strip feeding while plug wire PC3 controls printing groups 1 and 2**.

*Storage control circuits*

Figure 6C:
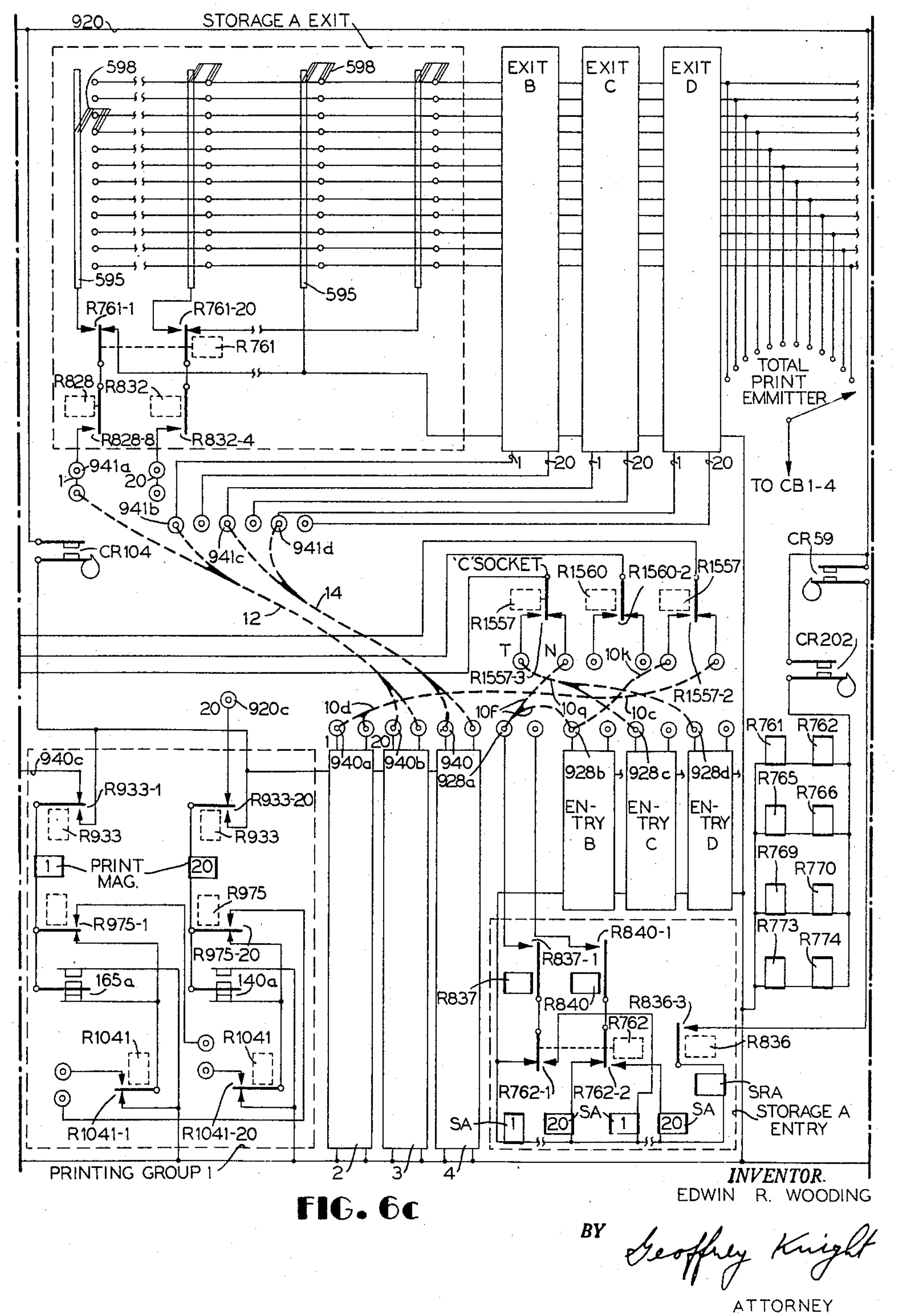

Referring to Fig. 6*c*, there is shown the circuits associated with storage entry and storage exit operations. The entry and exit controls are shown in detail only for storage unit A, while the entry and exit storage units B, C and D are shown in block diagram form.

The signal for initiating control activities is an all cycle impulse taken from a row of plug sockets labeled A. C. shown in Fig. 6*b*. This signal starts with line 920 and proceeds through CR49 cam contact; and CR50 cam contact in parallel, R1639*h* to the A. C. plug sockets. For convenience, it is to be assumed that the impulse extends through certain pilot selection controls now considered to be adjusted to pass the signal into a storage entry control plug socket AR1, shown in the right-hand corner of Fig. 6*d* and then through relay R836P2 shown in Fig. 6*e* to line 921. This relay initiates storage control activities for storage unit A. A hold circuit for relay R836H extends through R836—1 contacts through CF20 cam contacts to line 920. Upon closure of R836—2 points and CF21 cam contacts a circuit is completed to energize relays R837 and R840. The points of the latter relays are shown in Fig. 6*c* and control the entry of address data into the storage unit while a point of relay R836, namely R836—3 controls the energization of the storage unit restoring magnet SRA (also shown in Fig. 6*c*) in order to prepare the unit for mechanical operations. The circuit controlling the SRA magnet begins with line 920 and follows through CR59 cam contacts, R836—3 contacts, SRA magnet to line 921.

Address data is introduced into storage by means of plug wire connections to storage unit entry plug sockets such as 928*a* shown in Fig. 6*c*. Here, positions 1 and 20 are only shown in detail. In position 1 data is entered to energize the ratchet setup magnet SA by means of a circuit beginning with an entry hub 1 and extending through R837—1, R762—1, setup magnet SA to line 921. The contacts R762—1 are under control of a parent relay energized by means of a circuit beginning with line 920 and extending through CR202 cam contacts, relays R762, R761 in series therewith, to line 921. Simultaneously, relays R765, R766, R769, R770, R773 and R774 are energized by means of the same circuit. These relays are used to control various associated points distributed throughout the entry and exit circuits in order to store the zone portions, O—X—R, forming a part of the alphabetic characters. The zone portion of an alphabetic character is admitted into storage by means of a circuit beginning with plug socket 928*a*, position 1, and extending through R837—1, R762—1, now transferred, to set up ratchet magnet SA′.

Figure 6D:
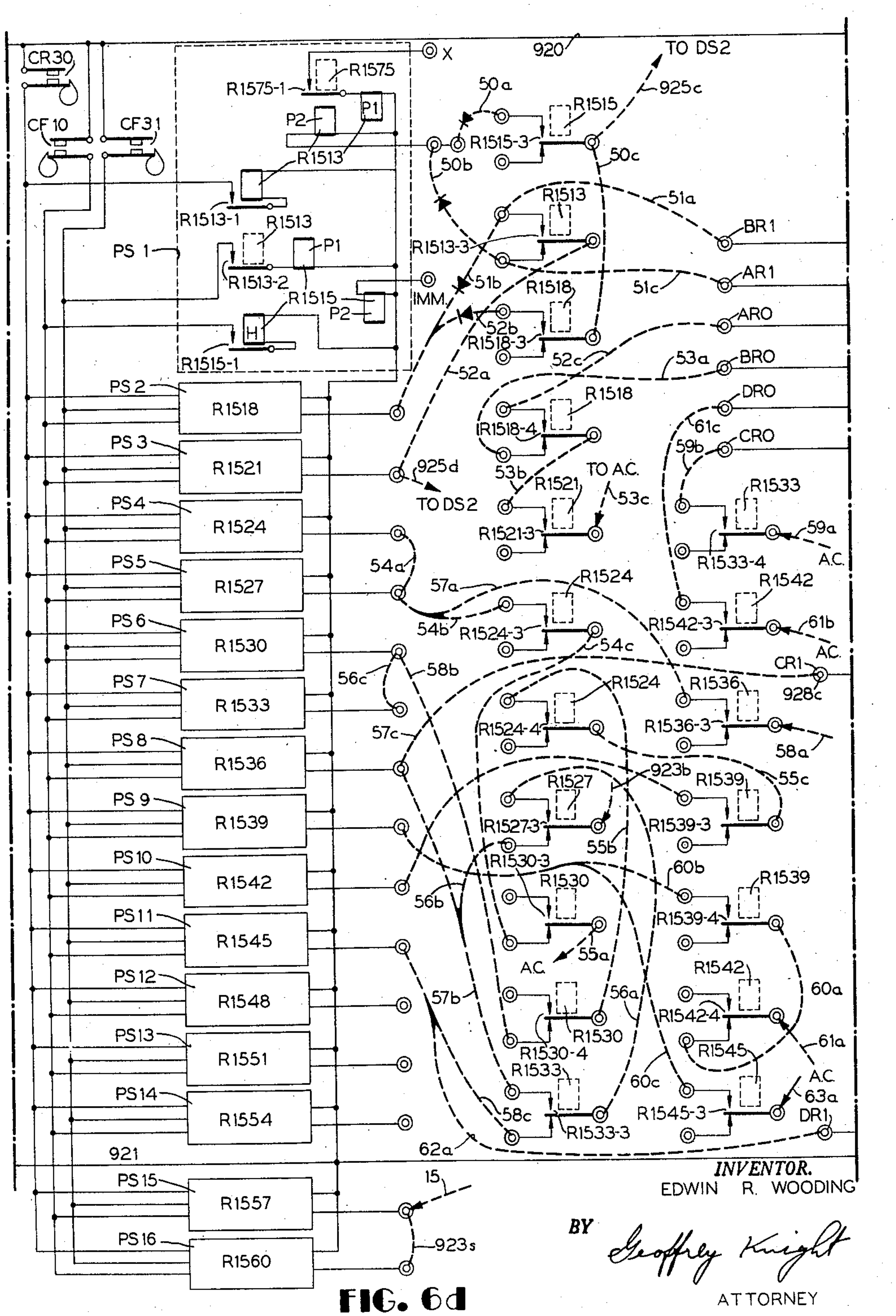
Figure 6E:
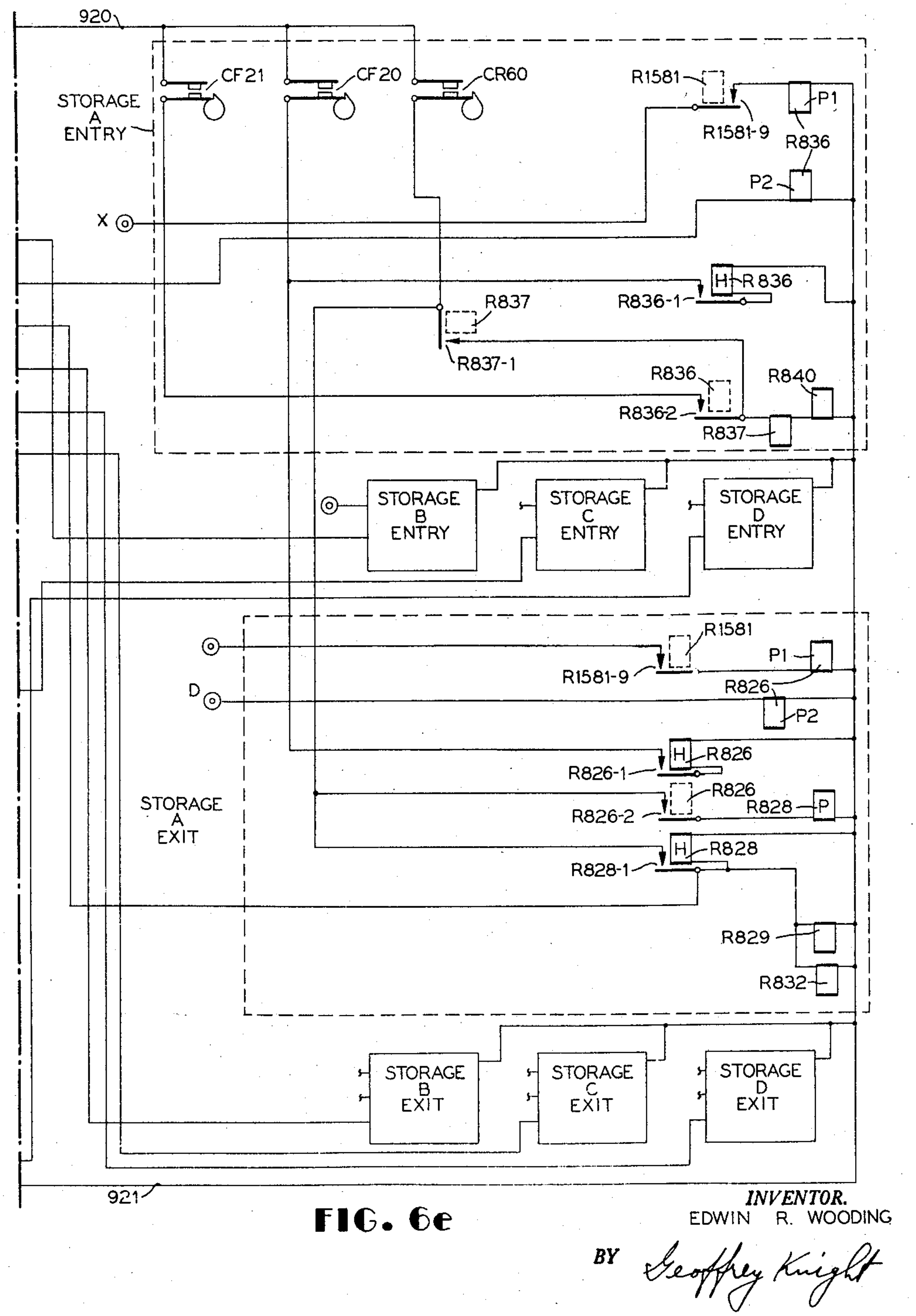

In order to control the readout of data from storage unit A it is necessary to energize storage exit control relays R828H, R829 and R832 all of which are shown in Fig. 6*e*. Usually an all cycle impulse is used to initiate this activity and for the sake of convenience in this case the all cycle impulse is assumed to enter an ARO plug socket shown in Fig. 6*d*. The circuit then continues through said relays R828H, R829 and R832 all wired in parallel, to line 921. Energization of these relays close associated points in the storage exit circuits of Fig. 6*c*. In reading data out of storage, for example the character A, two circuits are employed one of which emits the numeric portion of the alphabetic character while a second circuit emits the zone portion of the alphabetic character. Since the combination of an R zone and a numeric 1 constitutes the character A, the 1 is read out by means of a circuit beginning with line 920 and extending through CB1–4, total print emitter, at one time (see Fig. 6*c*) then through an associated connecting wire leading to the one spot in the readout commutator of the storage unit, wiper 598, common bar 595, R761—1 normally closed contacts, R828—8 to the exit socket 941*a* number 1 position. The reading out of the zone portion, the R, for example, follows a somewhat similar path except that the R pulse is emitted at R time through the total print emitter and passes through wiper 598′, common bar 595′, R761—1, now transferred, R828—8 to the same exit plug socket 941*a* position number 1. The readout of data from storage units B, C and D which are shown in block diagram form, is effected through associated plug sockets 941*b*, 941*c* and 941*d*, respectively. The entry of data into storage units B, C and D also shown in block diagram form is effected through plug sockets 928*b*, 928*c* and 928*d*, respectively.

*Strip feeding control circuits*

Referring to Fig. 6*a* there is shown in simplified form the circuit controls adapted to control the feeding of the strip S on which addresses are printed by the printing devices of the 407 tabulator. As briefly described earlier the tabulator controls initiate strip feeding and the tape governs the termination of strip feeding in accordance with the spacing of the perforations 1S in the tape, seen in Fig. 6*a*, particularly within the region defined by the dotted lines and indicated as casing C. Also shown therein in diagrammatic form is the mechanism associated with strip feeding and of which brief mention was made earlier. A drive motor M′ is shown connected across the lines 920 and 921 and is used to supply the motive power for driving the mechanism of the strip feeding means including a tape sensing drum 831 and a circuit breaker 895′ which operates the contacts 895. The tape sensing drum 831 and the circuit breaker 895′ are of course operated by clutches in turn controlled by the HS and LS magnets. The latter is only energized for slow speed operations whereas both are energized for high speed operations. Since it is desired to produce the address strip at maximum speed, the strip feeding controls are therefore set for high speed operations. Because of this, the HS and LS magnets have been shown without any individual controls which are shown in the Rabenda patent and in greater detail in the patent to A. W. Mills et al., No. 2,531,885, granted November 28, 1950.

Now proceeding with the description of the circuits, the circuit for feeding the address strip S is initiated by energizing relay R1597P2 (see Fig. 6*a*) under the control of a "3" perforation sensed in column 1 of the first read station. The circuit begins at line 920 and extends through CB1–4, CF28 cam contacts, R1630*b*, wire 991 column 1 plug socket 923, plug wire 929*a*, plug socket C of digit selector number 3, output socket 3, plug wire 923*c* to plug socket SKIP, relay R1597P2 to line 921. A hold circuit is established for relay R1597H upon closure of R1597—1 in conjunction with CF9 cam contacts (see upper left corner of Fig. 6*a*). Upon closure of R1597—2 and in accordance with the closure of CR25 cam contacts, relay R1612P is energized. A hold circuit follows for relay R1612H when R1612—1 points transfer. This circuit extends from line 921, wire 921*s*, wire 921*t*, wire 921*u*, relay R1612H, R1612—1 normally open side, R1684*d* to line 920. Prior to the transfer of points R1612—1 it may be appreciated that relay R1673 had been energized by a circuit path including R1612—1 normally closed points in conjunction with R1684*d* points. Thus, when R1612—1 does transfer relay R1673 drops out and accordingly closes its associated points R1673*c* to pick up relay R1662 under control of CF24 cam contacts. Upon closure of R1662*a* in conjunction with CR13 cam contacts, a hold circuit is established for relay R1662H. Also, upon closure of R1662B in conjunction with CR29 cam contacts the strip feed start relay R1676P picks up. A hold circuit for relay R1676H is established through R1676*b* and R1684A points. The closure of R1676B points in conjunction with R1683A sets up a circuit to energize the HS magnet which in turn sets up mechanical means incidental to high speed operations. Also the HS magnet, through an associated armature HS′ causes contacts 817 to close thereby causing LS magnet to be energized whereupon strip feeding means are activated to rotate the printing platen P and in accordance with the strip feeding means earlier described causes the strip S to be fed diagonally across the printing line of the 407 tabulator.

The strip feeding operation is terminated when perforation 1S in the tape is sensed by the sensing brush B1.

When this occurs a circuit is established by way of line 920, contacts 895, B13, tape sensing drum 831, sensing brush B1, R1612—2 through strip feeding stop relays R1683 and R1684 to line 921. When these relays are energized the point R1683A immediately opens up to de-energize the HS and LS magnets. Also the R1684A point opens up to drop out the strip feed start relay R1676.

*Pilot selectors*

The pilot selector is a well-known form of switching means which is generally controlled by a special perforation in a card when the latter is at the first read station and then closes contacts of the switch when the card is at the second read. Referring to Fig. 6*d* there are seen the controls associated with pilot selector number 1 which is shown in detail whereas the remaining pilot selectors 2–16 are shown in block diagram form. Each pilot selector is provided with an "X" plug socket which admits an "X" timed impulse, an "IMM" plug socket which when properly wired operates the pilot selector immediately as opposed to the above-described operation of the selector, and a "D" plug socket which admits a wide variety of impulses. Since we are not concerned with the controls associated with the "X" and the "IMM" controls, we shall proceed with an explanation of the controls associated with the "D" plug socket which when connected to a signal such as a digit from a perforation in the card or an A. C. pulse, causes the selector to operate on the following cycle as earlier mentioned.

The admission of a pulse into the "D" plug socket of pilot selector number 1 causes relay R1513P2 to be energized. A hold circuit is immediately established for relay R1513H upon the closure of R1513—1 contacts in conjunction with CR30 cam contacts. Upon closure of R1513—2 in conjunction with CF31 cam contacts relay R1515P1 is energized. A hold circuit is established for relay R1515H upon closure of R1515—1 in conjunction with CF10 cam contacts. The relay R1515 is provided with a pair of transfer contacts namely R1515—3 and R1515—4. Each of said transfer points is provided with a group of 3 plug sockets namely C, N and T. A pulse admitted into the C socket comes out of the N socket when the pilot selector is inoperative; but when the pilot selector is operated, as described, the pulse entering the C socket comes out of the T socket.

It may be noted further that relay numbers are shown within the blocks representing the pilot selectors PS2–PS16. Each of said designated relays is controlled in a manner similar to the manner of control described for relay R1515 associated with pilot selector 1. These relays in turn control associated transfer points located to the right of the selectors PS2–PS16. The pilot selectors PS12, PS13 and PS14 even though shown are not used in this particular case. Pilot selectors PS15 and PS16 control associated contacts R1557—2, R1557—3 and R1560—2 all shown at the top of Fig. 1*a*.

*Print magnet energizing circuits*

The circuits for energizing the print magnets identified as 361 are shown in Fig. 6*c*. Here the circuits are shown in detail only for two positions of printing group 1. The printing groups 2, 3 and 4 are shown in block diagram form. The address data is admitted into printing group 1 by way of plug sockets **940*c*, into printing group 2 by way of plug sockets 940*a*, into printing group 3 by way of plug sockets 940*b* and into printing group 4 by way of plug sockets 940**. Two positions namely the first and the last of each printing group are shown and as earlier explained an entire field representing an address line is admitted into a plurality of these sockets for printing the various lines of address data on the strip S.

The printing circuit operation may be described briefly by means of two circuits. The first circuit for energizing the print magnet determines the selection of a particular group of characters. The second circuit for energizing the same print magnet determines the particular character to be printed from the group of characters previously selected. The latter circuit controls the means for causing the printing to be effected on the address strip. The first of these two circuits in question is initiated when the numeric part of the alphabetic character is admitted to plug socket **940*c*. The circuit path then follows through the normally closed contacts of relay R933—1, print magnet 361, position 1, contacts 165*a* normally closed, R1041—1 normally closed to line 921. The operation of contacts 165*a* is such that the transfer operation is accomplished without a break occurring in the circuit. This contact is under control of the print magnet and the operation is completely described in the Rabenda patent. It may be mentioned briefly that at the end of the numeric pulse the contacts 165*a* will be shifted to a transferred position to accept the next input pulse which incidentally is a zone pulse. The circuit for energizing the print magnet under control of a zone pulse begins by admitting the zone pulse at plug socket 940*c* and then following through R933—1, print magnet 361, contacts 165*a*, now transferred, to line 921. In the case of a numeric character, a single pulse is admitted through the plug socket 940*c*. The numeric character is then selected for printing under control of the "N" pulse. The "N" pulse follows a path beginning with line 920 through CR104 cam contacts, R933—1, now transferred, print magnet 361, contacts 165*a*, now transferred, to line 921**. The contacts R933—1 are under control of a parent relay R933 shown in Fig. 6*b*. The circuit for energizing relay R933 begins with line 920 then follows through CR20 cam contacts, PC1*b* normally closed, a unidirectional current device R1, relays R933 and R936 to line 921. The group comprising relays R924, R927 and R930, all under control of PC2, are used to control other printing positions, not shown, of the machine. It may be briefly mentioned that the contacts PC1*b* and PC2*b* are under control of print control relays to be described very shortly. It may be noted from the timing chart of Fig. 7 that the timing of CR20 cam contacts overlaps the timing of the "N" pulse.

Having briefly explained the manner in which the print magnet is normally energized to affect printing, there is now to be considered the manner of selectively controlling the printing groups 1 and 2 by means of novel printing control circuits.

*Printing control circuits*

The printing control circuits are shown in the right half section of Fig. 6*b*. Here there is seen a pair of printing control sockets, namely, printing control number 1 and number 2. The admission of an impulse into either or both of these two sockets accordingly suppresses printing in either or both of the printing groups 1 and 2 in the cycle in which the pulse was admitted. The pulse must, of course, be admitted before 0 time in the cycle in order to prevent the admission of any zone pulses or the "N" pulses into the print magnet. The manner of affecting this control is initiated by admitting a "6" pulse by way of a plug wire PC3 connected between PC1 and PC2 sockets into the "6" socket of digit selector number 3. It may be noted from Fig. 1 that the "6" perforation appears in column 1 of the second card of a multiple address group. By virtue of the "6" perforation, printing will be suppressed for printing groups 1 and 2. From Fig. 1 it may be noted that printing is suppressed in cycles 4, 6, 9 and 12 for printing groups 1 and 2. The circuit to energize the print control relays PC1 and PC2 begins with line 920 and extends to CB1—4, CF28 cam contacts, R1630*b*, wire 991, column 1, plug socket 923, plug wire **923*a*, common socket of DS3, "6" socket, plug wire PC3, print control sockets 1 and 2, print control relays PC1 and PC2 to line 921**. A hold circuit for the relays is under control of associated contacts, namely, PC1*a* and PC2*a* in conjunction with CR16 cam contacts. Upon the transfer of contacts PC1*b* and PC2*b*, circuits are rendered operative to energize relays R924, R927, R930, R933 and R936. The circuit particularly for relay R933 begins with line 920 and proceeds through CR117 cam contacts, PC1*b*, now transferred, unidirectional device UD, relay R933 to line 921. Relay R933 is thus energized until 180° of the cycle in which it was energized. By virtue of this timing, it may be noted that contacts R933—1, seen in Fig. 6*c*, will be transferred and thereby prevent the admission of any of the zone pulses O, X and R to the print magnet 361. Now then after 180° of the cycle, the contacts R933—1 will drop back to normal to the position shown, and by virtue of this, the "N" pulse is thereby prevented from reaching the print magnet 361. Printing is thus suppressed for printing groups 1 and 2 by virtue of the printing controls exercised by the printing control relays PC1 and PC2 in the manner described.

*Plugging controls for the pilot selector and the storage units*

Now there is to be considered the manner in which the various lines of addesss data are transmitted, by way of plug wire connections, from the various fields of address cards to the storage units and the printing groups, and also the plugging connection associated with the control of the pilot selectors.

The plugging associated with the transmission of various lines of addresses has, in a limited sense, been earlier explained in conjunction with Fig. 1. However, for the purpose of showing the relationship of this plugging to the plugging controls associated with the pilot selectors the plugging will be explained in connection with the wiring diagram. It may also be mentioned that the single plug wires are used to represent a plurality of like connections.

Referring to Figs. 6*b* and 6*c* line 1 is transmitted from socket 942 of the first read by way of plug wire 10 to plug socket 940*c* of printing group 1.

Line 2 has two paths of transmission to printing group 2. The first path associated with field 2 of a 3 line address. This path follows through plug wire 10*a* plugged between second read socket 929 and the C socket associated with pilot selector contacts R1557—2, through the latter points then by way of plug wire 10*c*, plug wire 10*d* to socket 940*a* of printing group 2. Line 2 associated with a 4 line address begins with second read plug socket 939 then follows along plug wire 10*b*, then C socket associated with pilot selector points R1560—2, through the latter points now transferred, plug wire 10*d* to printing group 2.

In connection with the control of line 3 it is to be mentioned again that line 3 data is first read into storage and then from storage it is passed on to printing group 3. Referring to Fig. 1 it may be noted that storage units A and B are used to store line 3. The path for transmitting line 3 associated with a 3 line address begins with second read socket 931 then follows along plug wire 10*e*, the C socket associated with pilot selector contacts R1557—3, plug wire 10*f* to storage entry A begins with socket 941*a*, plug wire 12 to socket 940*b* of printing group 3. Now when storage B is involved in conjunction with the storage of 3 line data, the path is similar to that just described except that storage B rather than storage A accept 3 line data. There is also the path involving line 3 reading from a 4 line address. This path begins with second read socket 929 then follows along plug wire 10*a*, the C socket associated with R1557—2 contacts, through the transfer points of the latter, plug wire 10*k*, storage B entry socket 928*b*, or, storage A entry socket 928*a* depending upon which storage unit is controlled to accept the 3 line data.

Line 4 is entered into storage unit C or D depending upon which unit is rendered operative. The circuit path for transmitting line 4 begins with second read socket 931, then follows through plug wire 10*e*, the C socket associated with pilot selector contacts R1557—3, through the transferred contacts of the latter, plug wire 10*g* to storage sockets 928*c* and 928*d*. The readout of line 4 from storage C or D follows along plug wire 14. By means of controls which will next be described there will be shown how the storage units A, B, C and D are controlled in their entry and exit operations.

In Fig. 6*d* there are shown the various plug wire connections associated with the operations of the storage units A, B, C and D. Each storage unit has an entry control socket and an exit control socket. Storage unit A for example, has a pair of associated control sockets, namely, ARI and ARO. The ARI denotes storage A read-in; i. e., entry control for storage unit A. The ARO denotes storage A readout; i. e., storage A exit control. In like manner a pair of similar sockets are associated with each of the remaining storage units B, C and D. These sockets are identified BRI, BRO, CRI, CRO, DRI and DRO.

It is further seen in Fig. 6*d* that these storage control sockets are connected by means of plug wires 51*a*, 51*e*, 52*c*, 53*a*, 61*c*, 59*b*, 57*c* and 62*a* to a host of pilot selector contacts in turn controlled by associated pilot selectors PS1 through PS11. These pilot selectors are controlled by the special perforations in column 1 and in column 80 of the address cards. These special perforations are routed through the digit selectors 1, 2 and 3, shown in Fig. 6*b*. From these digit selectors the plug wires 931*f*, 923*b*, 925*c* and 925*d* are connected in various ways to affect control over the pilot selectors. There are also included in the pilot selector control circuits a number of plug connections labeled A. C. which connections are plugged to the A. C. sockets shown in Fig. 6*b*.

In order to facilitate an explanation of the control circuits involved in Fig. 6*d*, reference is invited to the operational chart shown in Fig. 8. This chart is drawn up to indicate the activities of storage units and the pilot selectors 1 through 11 for 12 cycles of operation which correspond to the 12 cycles of operation shown in Fig. 1. At the top of the chart of Fig. 8, there are shown the operational perforations which appear in columns 1 and 80 of the address cards. It must be appreciated in connection with this part of the chart that the locations representing columns 1 and 80 bear no timing relationship to the rest of the chart wherein are shown the timings for the pilot selectors and the storage units. The locations of columns 1 and 80 and the perforations shown therein are presented merely as an expedient to indicate what particular operational perforations are available in any particular cycle of operation.

The timing shown in the chart of Fig. 8 are each represented by a line having a broken portion and a solid portion. The broken portion of the line denotes that pickup controls are exercised on a particular pilot selector or storage unit for read-in or readout operations. The solid portion of the line indicates that the particular pilot selector or storage unit is operated. For example, in cycle 1 a broken portion of the line for pilot selector number 1 indicates pickup control while the solid portion of the same line shown in cycle 2 indicates that the pilot selector number 1 is actually picked up, in other words, the transfer points associated with the pilot selector are transferred in the second cycle. In the case of the storage unit controls the broken portion and the solid portion have the same significance. For example, in cycle 1 the read-in controls for storage "ARI" are being picked up in cycle 1, while in cycle 2 the storage unit A is actually undergoing a read-in operation.

In accordance with Fig. 1 and the wiring controls shown in the wiring diagram, it has been explained how line 1 and line 2 are read from the address cards and printed out of printing groups 1 and 2, respectively. The control for the selection of line 2 from either a 3 line or a 4 line address is under control of pilot selectors PS15 and PS16 both wired in parallel by means of plug wire 923*s*, seen in Fig. 6*d*. It may be appreciated that plug wire 15 conveys a "6" pulse from DS3 to pilot selectors PS15 and PS16. In Fig. 1 there is seen that the "6" pulse is read from the second card of a 4 line address and may be seen to appear in the second card of address groups 3, 4, 6 and 8. In the cycles in which pilot selectors PS15 and PS16 are effective, line 2 is printed from field 2 of the 4 line address groups. On the strip this shows up as A3L2, A4L2 and A6L2 all printed out of printing group 2. The remaining notations, namely, A1L1, A2L2, A5L2 and A7L2 are printed from field 2 of a 3 line address when the pilot selector PS15 and PS16 are de-energized.

Now in connection with the controls for effecting printing of line 3 there is to be considered the storage entry and exit controls for storing line 3. Beginning with cycle 2, it may be seen in Figs. 1 and 8 that pilot selectors 1 and 3 are energized and that storage unit A undergoes a read-in operation while storage B undergoes a readout operation. Considering the latter, nothing is read out since no data was fed into storage B. In the case of storage A, A1L3 is entered therein. Referring to the chart of Fig. 8, cycle 2, the pilot selectors PS1 and PS3 were picked up as a result of a 3 perforation in column 80 initiating the control in cycle 1. This 3 pulse is transmitted by way of plug wire **925*d*** to the pickup of pilot selector PS3, seen in Fig. 6*d* and to pilot selector 1 by way of plug wire **52*a*, R1513—3, plug wire 50*b* to pickup of pilot selector 1. It may be further seen that plug wire 51*c* transmits the 3 pulse to the ARI socket of storage unit A. Now in Fig. 1 it may be seen that address data read into storage A is indicated as A1L3. In cycle 2 of Fig. 8 it is also seen that pickup controls are exercised for pilot selectors PS2 and PS3. In cycle 3 it is seen that these selectors are picked up. The control in this case is again initiated by a 3 in column 80 of the first read. The 3 pulse is transmitted by way of plug wire 925*d*, then pickup socket for pilot selector number 3, plug wire 52*a*, R1513—3, now transferred, to the pickup socket of pilot selector number 2 and also to storage BRI socket by way of plug wire 51*a*. Also in cycle 3, storage A will undergo a readout. The control of storage A for a readout is traced as follows: Beginning at the ARO socket then through plug wire 52*c*, R1518—4, now transferred, 53*b*, R1521—3, now transferred, plug wire 53*c*** extending to the A. C. socket shown in Fig. 6*b*. Now in Fig. 1 it may be seen that in cycle 3, A2L3 is entered in storage B, while A1L3 is read out of storage A. A1L3 is printed on the strip S from printing group 1. In cycle 3 of Fig. 8, a pickup is effected for pilot selector PS2 so as to cause the same to be energized in cycle 4. This operation is under control of a 1 pulse coming from column 80 of the first read. The 1 pulse is channeled through DS2 and follows along plug wire **925*c*, plug wire 50*c*, R1518—3 now transferred, plug wire 52*b* to the pickup socket of pilot selector number 2. By means of this control, pilot selector number 2 will be energized in cycle 4. Considering the storage activity in cycle 4, it is noticed that no read-in or readout operation is effected. The reason for this may be appreciated by referring to Fig. 1, cycle 4, which shows that the first card of a 4 line address is in the second read while the second card of the same address is in the first read. In view of this, printing is not effected nor is there any address data available for storage from the address card in the second read. Referring to Fig. 8, it is further seen that pickup controls are again effected for pilot selector PS1 and PS2 under control of a "3" in column 80. Also in this cycle, pickup controls are effected for pilot selector number 8. It is further seen that read-in pickup controls are initiated for storage units A and C while readout controls are also initiated for storage unit B. The effect of this may be seen in cycle 5 of Fig. 1. There we see that A3L3 and A3L4 are read into storage units A and C, respectively, while A2L3 is read out of storage B and printed out of printing group 2. In the same cycle it may be seen that A4L1 and A2L3 are printed out of printing groups 1 and 3, respectively. The pickup controls for pilot selector PS8 and storage C read-in are initiated by a "6" readout of column 1 of the first read. The "6" pulse is routed through PS3 and then follows along plug wire 925*b* into the C socket associated with R1527—3, plug wire 56*b* to the pickup socket of pilot selector PS8 and to CRI socket by way of plug wire 57*c***.

In cycle 5, pickup controls are initiated for pilot selectors PS1, PS4 and PS5 to cause the same to be energized for cycle 6. The pickup for selector PS1 has been described. The pickup for pilot selectors PS4 and PS5 begins with an A. C. pulse transmitted along plug wire **58*a* to the C socket associated with R1513—3 now transferred, plug wire 57*a* to the pickup socket of PS4 and PS5. In cycle 6 the storage units are not active. Referring to Fig. 1, it is seen that conditions in cycle 6 are somewhat the same as they were in cycle 4 because of the presence of the first card of a 4 line address in the second read and the presence of the second card of the same 4 line address in the first read. In this cycle, cycle 6, the pickup controls for storage ARO, BRI and DRI are initiated. Also pickup controls are initiated for pilot selectors PS2, PS3, PS4, PS5 and PS11. Pickup controls for storage DRI and pilot selector PS11 are effected through plug wire 923*b* along which a "6" pulse is routed through R1527—3 now transferred, plug wire 56*a*, R1533—3, plug wire 53*c* to the pickup socket of pilot selector PS11 and also to DRI socket by way of plug wire 62*a***.

Cycle 7, in the chart in Fig. 8 shows that pilot selector PS2, PS3, PS4, PS5 and PS11 are energized. Also in operation are storage units A, B and D. To appreciate the significance of this, reference is also invited to Fig. 1 where in cycle 7 there is seen that A3L3 is read out of storage A and printed out of printing group 3 while A4L2 and A5L1 are simultaneously printed out of print groups 1 and 2, respectively. Also A4L3 and A4L4 are being entered into storage B and D. In order to set up conditions for cycle 8, pickup controls are initiated in cycle 7 for pilot selectors PS1, PS3, PS6, PS7 and PS9. Also in cycle 7, pickup controls are initiated for storage units A, B and C, that is, read-in for storage A and readout for storage units B and C. The pickup control for selectors PS6 and PS7 in cycle 7 is initiated by a "3" read from column 80 of the second read. The "3" is routed through DS1 along the plug wire **931*f* to the C socket associated with R1537—3, plug wire 55*c*, R1524—4, now transferred, plug wire 55*b*, the C socket associated with R1530—4, plug wire 58*b* to the pickup socket of PS6, and by way of plug wire 56*c*** to the pickup socket of PS7.

The pickup for PS9 begins with an A. C. pulse carried along plug wire **63*a* to the socket associated with R1545—3, through the transfer points of the latter, plug wire 60*c*** to the pickup socket of PS9.

In cycle 8 it is seen that pilot selectors PS1, PS3, PS6, PS7 and PS9 are energized. Also storage units A, B and C are active, storage A reads in while storage units B and C read out. Referring to cycle 8 in Fig. 1, it is noted that A5L3 is read into storage A while A4L3 and A3L4 are read out of storage units B and C, respectively, and printed out of printing group 3 and 4, respectively. It is also to be noted that A5L2 and A6L1 are also printed in this cycle out of printing groups 2 and 1, respectively.

Having gone through the various plugging controls, it is believed that further detailed explanation of the plugging controls is unnecessary, since the operations may be followed in accordance with the pattern of timings shown in the chart of Fig. 8 in conjunction with Fig. 1.

*Detection of missing cards and cards not in proper sequence*

There are now to be considered the controls which are provided to stop the machine in the event a card is missing from a multiple card group, or, the cards in the multiple card group are revered, or, when the cards in the multiple card group are in sequence but are not of the same address group.

Under the condition of a missing card from a multiple card group the controls are adapted to detect the absence of either the first or second card of a two-card address group. In the case of a reversal in sequence of the cards in a multiple address group, that is to say, that if the second card comes before the first card, the controls will also provide a signal. In the last condition namely when the cards of the group are in proper sequence relative to first and second positions but are of different address groups, a signal will also be provided.

The means for providing a signal for each of the conditions described include the well-known group control circuits used in conjunction with a pilot selector controlled by a special perforation appearing in column 80 of the first address card.

The group control is a well-known means found in record control accounting machines. Briefly, such means includes devices for analyzing the holes in corresponding card columns of successively fed cards for determining the presence of similar or dissimilar holes in the compared columns, and upon detecting a group number change, total taking operations are initiated.

Since the present invention is not concerned with total taking operations, the group control signal is therefore not used for total taking operations, instead, it is used to stop the machine so that an immediate inspection can be made of the cards.

Since the group control circuits are well known in the art they are shown in diagrammatic form in the circuit of Fig. 9. Here we find that the group control is represented by a box to which are connected sockets 943, 945 and 947. Within the box are seen two relay numbers, namely, R593 and R594. In the aforementioned Rabenda patent, particularly in Fig. 31*d*, and as further explained in said patent beginning on page 58 under the heading of "Automatic Group Control," the sockets 943, 945 and 947 together with the relays R593 and R594 are concerned with group control operations. As explained in said Rabenda patent, the socket 943 is connected to a second read socket while socket 945 is connected to a corresponding first read socket. By virtue of these connections and a plurality of similar corresponding connections, the cards are analyzed on the basis of group control. In the event of a change from one group of cards to another group, a signal is provided at socket 947. Now then in the cards used in the illustrative example in Fig. 1 of the instant case it is understood, even though not shown, that a group control number is recorded in each of the address cards. This control number is part of the normal procedure attending the preparation of address cards in accounting operations and is the means whereby related cards are brought together in the same group. The group control number, of course, occupies a plurality of columns in the card. In the circuit of Fig. 9, a single sample diagrammatic circuit is shown which includes a second read socket **942*a* connected by means of a plug wire 72*b* to group control socket 943. Also, a first read socket 942*r* connected by means of a plug wire 72*a* to a corresponding group control socket 947. In the event of a disagreement in the group control numbers in the cards being analyzed, a signal is provided at the socket 947. It is further seen that socket 947 is connected by means of a plug wire 72*c* to the "T" socket associated with pilot selector PS17*b* contacts in turn controlled by a pilot selector PS17. The "T" socket of pilot selector PS17 is connected by way of a plug wire 73*a* to the 1 socket of a digit selector DS5 shown in block diagram form. The C socket of DS5 is connected by way of plug wire 71*b* to socket 923*s* representing column 80 of the first read. By means of the circuit just traced a "1" sensed in column 80 initiates pickup controls for PS17 so as to cause the selector to be energized on the following cycle. An inspection of cards in Fig. 1 shows that the "1" appears in the first card of the two-card address groups while a "6" appears in column 1 of the second card of the address groups. The "6" is conveyed through socket 923, plug wire 71*a*, the C socket of digit selector DS4, through the "6" socket thereof, plug wire 73*b* to the "N" socket of pilot selector contacts PS17*b*. The C socket of PS17*b* is connected by means of a plug wire 74*a* to a socket 74*b* connected to a stop relay RST. The stop relay when energized closes contacts RST*a* to establish a hold circuit beginning with the line 920 and extending through CR2 cam contacts, RST*a* contacts, relay RSTH to line 921**.

The contacts **RST*b* are placed in the circuit controlling the picker knife clutch magnet 64. This magnet controls the operation of the picker knives in the card feed of the 407 tabulator. When the picker knives fail to feed a card the 407 tabulator stops running in the manner described in the said Rabenda patent. To explain the operations of the circuit, first, it will be assumed that the first card of a two-card address group is missing. Under this condition, PS17 fails to pick up. Accordingly, PS15*b* enables the "6" pulse of the second card to pass through PS17*b* to pick up the stop relay RST** to stop the machine.

On the other hand, when the first card is present and the second card is absent the stop relay RST is picked up by virtue of the group control pulse passing through socket 947, **PS17*b* now transferred, through plug wire 74*a* to the stop relay RST. In this example, PS17 is energized by virtue of the "1" pulse sensed from column 80 of the first card. This causes PS17 to be energized on the following cycle when the first card enters the second read at the same time that the next card of the following address group enters the first read. The group control senses a disagreement and provides a signal out of socket 947 which is conveyed through plug wire 72*c*, PS17*b* now transferred, to the stop relay RST**.

Under the conditions of a reversal in the sequence of the first and second cards of an address group, the second card enters the first read before the first card, hence a "6" pulse passes through **PS17*b* before it has an opportunity to transfer, hence the stop relay RST** is picked up.

In the last condition, i. e., when the cards in the multiple card group are in sequence but are not of the same address group, the stop relay is picked up by virtue of the fact that the first card containing the "1" causes PS17 to be energized on the following cycle in which cycle a disagreement is sensed by the group control. The group control pulse then passes through plug wire **72*c*, PS17*b* now transferred, plug wire 74*a* to the stop relay RST**.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a cyclically operating record controlled printing machine, the combination with a plurality of banks of print members arranged in a single row, for printing respective lines of a multiple line address, or the like, and means to feed a record strip intermittently in a slanting direction along the row of printing members, whereby line spacing of the strip occurs as an incident to feed of the strip to bring successive areas thereof successively opposite the respective banks of printing members; of record reading means including a plurality of groups of sensing elements, means for feeding records singly in sequence to said record reading means, and print members control means controlled by said reading means to determine the characters to be printed thereby, said print member control means including means to switch the control of at least one of said banks of print members from one of said groups of sensing elements to another.

2. A printing machine as described in claim 1, characterized by the fact that at least one of said groups of sensing elements is arranged at one reading station and at least one other of said groups of sensing elements at another reading station, said record feeding means being adapted to feed each record first to one of said reading stations and then to the other, said strip feeding means being adapted to feed the strip from one bank of print members to the next in time with the feeding of a record from one reading station to the next.

3. A printing machine as described in claim 2, characterized by the fact that two groups of sensing elements at the two different reading stations are adapted to sense the same record field.

4. A printing machine as described in claim 3, characterized by selective means to suppress the control of one of said groups of sensing elements over a bank of print members during one machine cycle.

5. A printing machine as described in claim 4, wherein said selective means includes means to sense a special designation on one of the records.

6. In a printing machine for printing multiple line addresses, or the like, under control of records which may have the data of lines 1, 2 and 3 of a 3 line address located in fields 1, 2 and 3, respectively, of a single record, the data of line 1 of a 4 line address located in field 1 of the first record of a two-record group, and the data of lines 2, 3 and 4 of a four line address located in fields 1, 2 and 3 of the second record of a three-record group; the combination with a plurality of banks of print members arranged in a single row, and means to feed a strip intermittently along the row of print members at a slight angle to the row, whereby line spacing of the strip occurs as an incident to the feed of the strip to bring successive areas thereof successively opposite the respective banks of print members; of record reading means comprising a plurality of groups of sensing elements, means to feed records in succession to said record reading means, and means operatively connecting the sensing elements and print members so that the latter are controlled by the former, said connections including record controlled switching means to switch the control of the banks of print members for lines 2 and 3 from the sensing elements sensing fields 2 and 3, respectively, to the sensing elements sensing fields one and two, respectively, when a 4 line address is to be printed.

7. In a record controlled machine for printing an address strip, said records being divided into groups, each group consituting a multiple part address contained in at least two cards; one of said cards containing a single field of address indicia representing a plurality of address parts, said cards each distinguished by a special indicum which denotes the number of fields of address indicia, first and second reading stations arranged to read said records in succession including reading means in each station to read said field of address indicia and others to read said special indicia, a plurality of groups of settable printing devices arranged to print along a common printing line, a certain one of said groups adjusted to represent an address part in accordance with address indicia read by reading means in said first reading station while another of said groups is adjusted to represent another address part in accordance with address indicia read by reading means in said second reading station, and while still another of said groups is adjusted to represent an address part derived from storage means, said storage means adjusted to represent other address parts including said last-mentioned address part in accordance with address indicia read by other reading means in said second reading station, means for holding said strip at an incline relative to the printing line to receive a series of impressions of different address parts of different addresses, the angle of inclination formed between said inclined strip and the printing line being such that when the strip is advanced from one group of printing devices to the next group the printed line thereon is raised one line space, printing means normally effective to effect printing of certain of said address parts, printing means selectively controlled to effect printing of others of said address parts, and strip feeding means rendered effective as an incident to the printing of said last-mentioned address parts.

References Cited in the file of this patent

UNITED STATES PATENTS

| | | |
|---|---|---|
| 1,745,994 | Hubbard | Feb. 4, 1930 |
| 1,954,041 | Daly | Apr. 10, 1934 |
| 2,168,364 | Schaefer | Aug. 8, 1939 |
| 2,202,958 | McFarland | June 4, 1940 |
| 2,240,667 | Paris | May 6, 1941 |
| 2,566,932 | Dayger | Sept. 4, 1951 |
| 2,569,829 | Rabenda | Oct. 2, 1951 |
| 2,580,729 | Carroll | Jan. 1, 1952 |